(12) United States Patent
Doucet et al.

(10) Patent No.: US 12,072,505 B2
(45) Date of Patent: Aug. 27, 2024

(54) DISPLAY CONTROL APPARATUS, DISPLAY CONTROL METHOD, AND RECORDING MEDIUM

(71) Applicant: Sony Interactive Entertainment Inc., Tokyo (JP)

(72) Inventors: Nicolas Doucet, Yokohama (JP); Yutaka Yokokawa, Kanagawa (JP); Masafumi Noda, Tokyo (JP); Takumi Yoshida, Tokyo (JP); Keiichiro Ishihara, Tokyo (JP); Gento Morita, Tokyo (JP); Yuki Miyamae, Tokyo (JP); Ngo Tuyen Thibaud, Tokyo (JP); Kazutomo Sasaki, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 78 days.

(21) Appl. No.: 17/945,343

(22) Filed: Sep. 15, 2022

(65) Prior Publication Data

US 2023/0009819 A1    Jan. 12, 2023

Related U.S. Application Data

(63) Continuation of application No. 16/872,916, filed on May 12, 2020, now Pat. No. 11,474,361, which is a
(Continued)

(30) Foreign Application Priority Data

Feb. 27, 2015   (JP) ................................ 2015-039075

(51) Int. Cl.
*G02B 27/01* (2006.01)
*A63F 13/211* (2014.01)
(Continued)

(52) U.S. Cl.
CPC ........ *G02B 27/0179* (2013.01); *A63F 13/211* (2014.09); *A63F 13/212* (2014.09);
(Continued)

(58) Field of Classification Search
CPC .............. G02B 27/0179; G02B 27/017; G02B 27/0172; G02B 2027/014;
(Continued)

(56) References Cited

U.S. PATENT DOCUMENTS 7,612,777 B2 * 11/2009 Nagata ..................... G06T 13/20
345/473
2005/0195184 A1 * 9/2005 Yoshiike ............. A63F 13/5258
345/419
(Continued)

FOREIGN PATENT DOCUMENTS

JP    2000-353249 A    12/2000
JP    2007-244534 A     9/2007
(Continued)

OTHER PUBLICATIONS

United States Office Action dated Apr. 6, 2017, from corresponding U.S. Appl. No. 15/019,339.
(Continued)

*Primary Examiner* — Pegeman Karimi
(74) *Attorney, Agent, or Firm* — XSENSUS LLP

(57) ABSTRACT

A display control apparatus includes: a head mounted display information acquisition block configured to acquire information indicative of a position of a head mounted display worn on a head of a user; an input apparatus information acquisition block configured to acquire information indicative of a position of an input apparatus for use by the user; an instruction input acquisition block configured to acquire information indicative of an instruction entered in the input apparatus; and an image generation block config-
(Continued)

ured to generate an image to be displayed on the head mounted display on a basis of an instruction acquired by the instruction input acquisition block. The image generation block displays an image of the input apparatus at a position in the image determined on a basis of a relative position with the head mounted display of the input apparatus.

17 Claims, 14 Drawing Sheets

Related U.S. Application Data continuation of application No. 16/001,276, filed on Jun. 6, 2018, now Pat. No. 10,712,575, which is a continuation of application No. 15/019,339, filed on Feb. 9, 2016, now Pat. No. 10,025,105.

(51) Int. Cl.
| | | |
|---|---|---|
| *A63F 13/212* | (2014.01) | |
| *A63F 13/26* | (2014.01) | |
| *A63F 13/40* | (2014.01) | |
| *A63F 13/825* | (2014.01) | |
| *A63F 13/95* | (2014.01) | |
| *G06F 3/01* | (2006.01) | |
| *G06F 3/03* | (2006.01) | |
| *G06F 3/04815* | (2022.01) | |

(52) U.S. Cl.
CPC ............. *A63F 13/26* (2014.09); *A63F 13/40* (2014.09); *A63F 13/825* (2014.09); *A63F 13/95* (2014.09); *G02B 27/017* (2013.01); *G02B 27/0172* (2013.01); *G06F 3/011* (2013.01); *G06F 3/0304* (2013.01); *G06F 3/04815* (2013.01); *A63F 2300/308* (2013.01); *G02B 2027/014* (2013.01); *G02B 2027/0178* (2013.01); *G02B 2027/0187* (2013.01)

(58) Field of Classification Search
CPC .... G02B 2027/0178; G02B 2027/0187; A63F 13/211; A63F 13/212; A63F 13/26; A63F 13/40; A63F 13/825; A63F 13/95; A63F 2300/308; G06F 3/011; G06F 3/0304; G06F 3/04815

See application file for complete search history.

(56) References Cited

U.S. PATENT DOCUMENTS

| | | |
|---|---|---|
| 2007/0298885 A1 | 12/2007 | Tran |
| 2009/0125590 A1 | 5/2009 | Hayano et al. |
| 2011/0072367 A1 | 3/2011 | Bauer |
| 2014/0361956 A1 | 12/2014 | Mikhailov et al. |
| 2015/0049018 A1 | 2/2015 | Gomez |
| 2015/0352437 A1* | 12/2015 | Koseki ................ A63F 13/5255 463/31 |
| 2016/0343168 A1 | 11/2016 | Mullins et al. |

FOREIGN PATENT DOCUMENTS

| | | |
|---|---|---|
| JP | 2008-173345 A | 7/2008 |
| JP | 2012-053631 A | 3/2012 |
| JP | 2013-258614 A | 12/2013 |
| JP | 2015-232783 A | 12/2015 |
| WO | 2011/142165 A1 | 11/2011 |

OTHER PUBLICATIONS

United States Office Action dated Oct. 25, 2017, from corresponding U.S. Appl. No. 15/019,339.
United States Notice of Allowance dated Mar. 20, 2018, from corresponding U.S. Appl. No. 15/019,339.
United States Office Action dated Sep. 11, 2019, from corresponding U.S. Appl. No. 16/001,276.
United States Office Action dated Jan. 15, 2020, from corresponding U.S. Appl. No. 16/001,276.
United States Notice of Allowance dated Mar. 13, 2020, from corresponding U.S. Appl. No. 16/001,276.
United States Office Action dated Oct. 1, 2020, from corresponding U.S. Appl. No. 16/872,916.
United States Office Action dated Feb. 23, 2021, from corresponding U.S. Appl. No. 16/872,916.
United States Office Action dated Aug. 17, 2021, from corresponding U.S. Appl. No. 16/872,916.
United States Office Action dated Jan. 13, 2022, from corresponding U.S. Appl. No. 16/872,916.
United States Notice of Allowance dated Jun. 15, 2022, from corresponding U.S. Appl. No. 16/872,916.
Japanese Office Action dated Oct. 23, 2018 for the Corresponding Japanese Patent Application No. 2015-039075.
Japanese Office Action dated Feb. 12, 2019 for the Corresponding Japanese Patent Application No. 2015-039075.
Japanese Preliminary Report dated Jan. 28, 2020, for the Corresponding Japanese Patent Application No. 2015-039075.

* cited by examiner

FIG.1
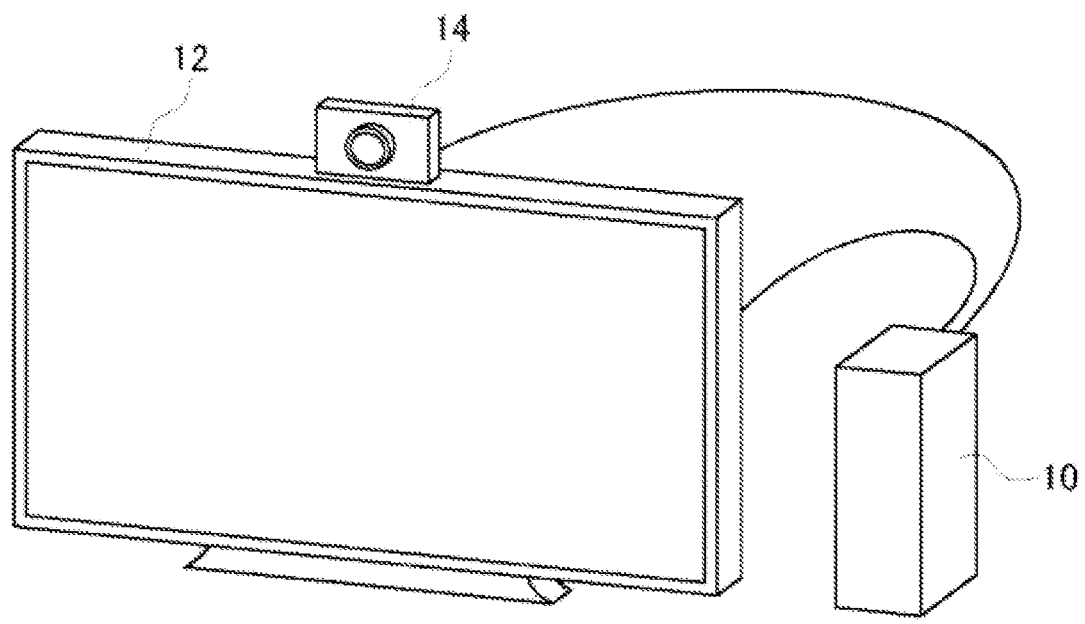
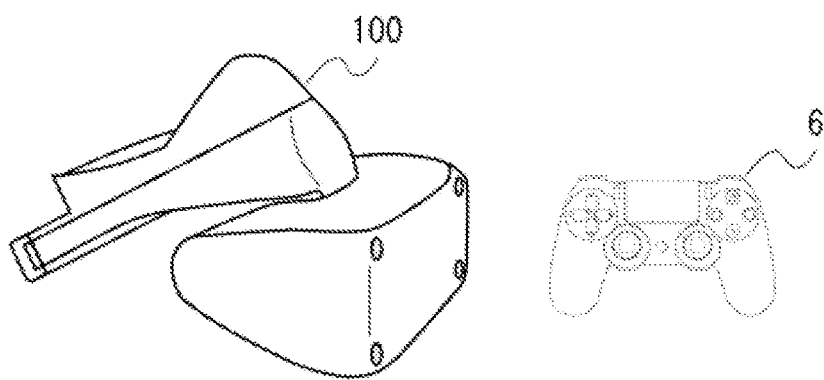

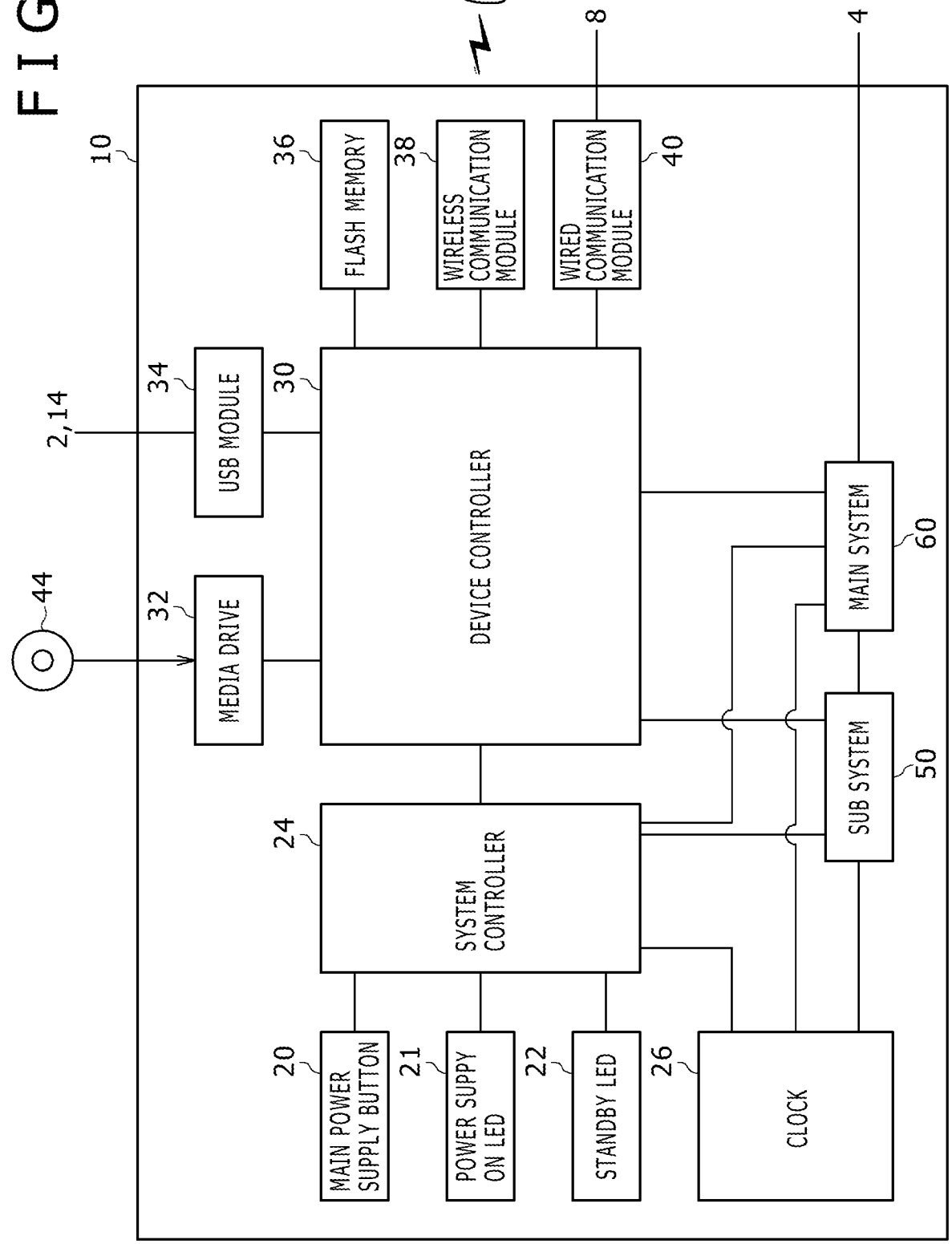

DISPLAY CONTROL APPARATUS, DISPLAY CONTROL METHOD, AND RECORDING MEDIUM

BACKGROUND

The present disclosure relates to a display control technology and, more particularly, to a display control apparatus, and a display control method that are configured to control display on a head mounted display, and a non-transitory computer-readable recording medium.

Game playing is practiced in which, with a head mounted display that is connected to a game machine worn on the head of a user, the user operates a controller for example while looking at a screen displayed on the head mounted display. With an ordinary stationary display connected to a game machine, the user's visual field range extends also to the outside of a display screen, so that the user may not concentrate on the screen or lose the sense of absorption in the game being played. On the contrary, wearing a head mounted display makes the user look at only the video shown on the display, thereby providing effects of the increased sense or absorption and enhanced game entertainment.

SUMMARY

The inventors hereof recognized that, in order to allow more and more users to enjoy games in which head mounted displays are used, display control technologies of higher convenience are required.

In carrying out the disclosure and according to one mode thereof, there is provided a display control apparatus. The display control apparatus includes: a head mounted display information acquisition block configured to acquire information indicative of a position of a head mounted display worn on a head of a user; an input apparatus information acquisition block configured to acquire information indicative of a position of an input apparatus for use by the user; an instruction input acquisition block configured to acquire information indicative of an instruction entered in the input apparatus; and an image generation block configured to generate an image to be displayed on the head mounted display on a basis of an instruction acquired by the instruction input acquisition block. The image generation block displays an image of the input apparatus at a position in the image determined on a basis of a relative position with the head mounted display of the input apparatus.

According to another mode thereof, there is provided a display control method for a computer, including: acquiring information indicative of a position of a head mounted display worn on a head of a user; acquiring information indicative of a position of an input apparatus for use by the user; acquiring information indicative of an instruction entered in the input apparatus; generating an image to be displayed on the head mounted display on the basis of an acquired instruction; and displaying an image of the input apparatus at a position in the image determined on a basis of a relative position with the head mounted display of the input apparatus.

According to a further mode thereof, there is provided a non-transitory computer-readable recording medium recording a display control program for a computer, the program including: by a head mounted display information acquisition block, acquiring information indicative of a position of a head mounted display worn on a head of a user; by an input apparatus information acquisition block, acquiring information indicative of a position of an input apparatus for use by the user; by an instruction input acquisition block, acquiring information indicative of an instruction entered in the input apparatus; and by an image generation block, generating an image to be displayed on the head mounted display on a basis of an instruction acquired by the instruction input acquisition block. The image generation block displays an image of the input apparatus at a position in the image determined on a basis of a relative position with the head mounted display of the input apparatus.

It should be noted that any combinations of the components described above and those obtained by translating the expressions of the present invention between method, apparatus, and system are also valid as embodiments of the present invention.

As described and according to the embodiments of the present disclosure, user convenience of a head mounted display is enhanced.

BRIEF DESCRIPTION OF THE DRAWINGS

FIG. 1 is a perspective views illustrating a usage environment of a game system practiced as one embodiment of the present disclosure;

FIG. 5 is a diagram illustrating a configuration of a game machine;

DETAILED DESCRIPTION OF THE PREFERRED EMBODIMENTS

Figure 2:
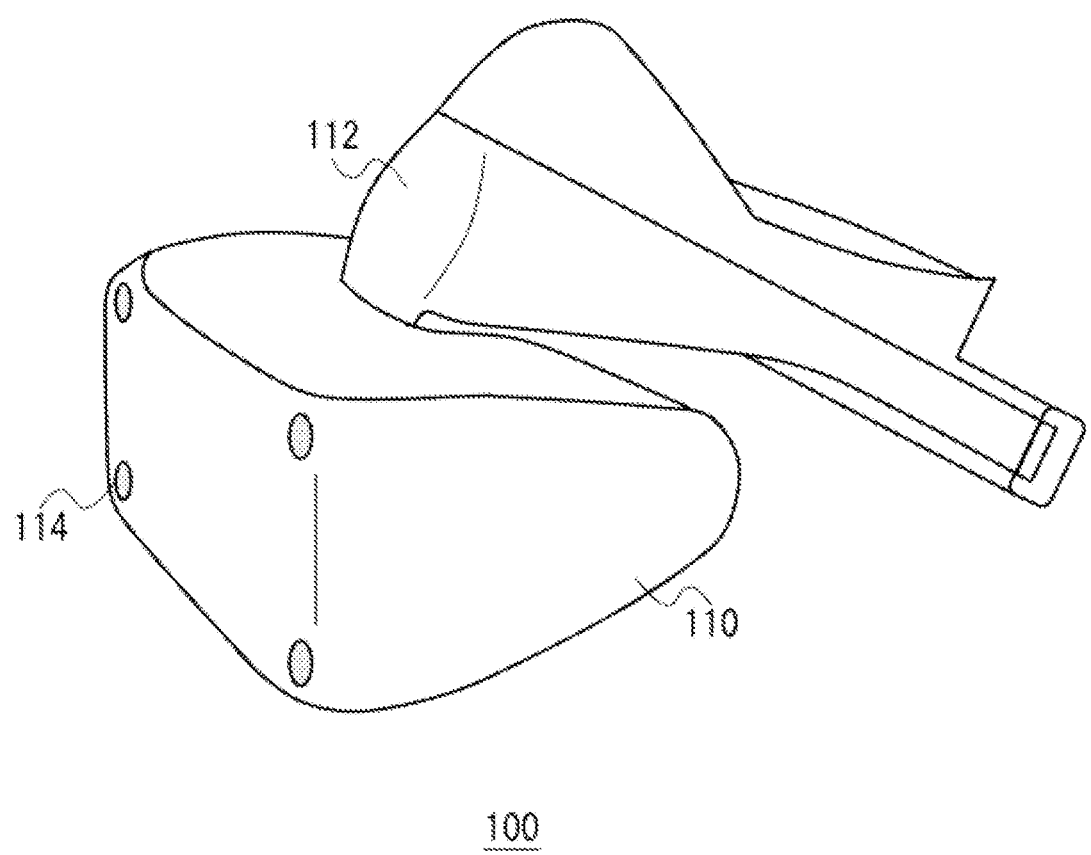
FIG. 2 is an external perspective view illustrating a head mounted display practiced as another embodiment of the present disclosure.

The following describes a display technology based on a head mounted display (HMD). A head mounted display is a display apparatus that are mounted on the head of a user such that the eyes of the user are covered, thereby allowing the user to view still images and moving images displayed on a display screen arranged in front of the user's eyes. The subjects to be displayed on the head mounted display may be such content as movies or television programs; in the present embodiment, an example is described in which a head mounted display is used as a display apparatus that displays game images.

Now, referring to FIG. 1, there is shown an environment in which a game system 1 practiced as one embodiment of the present disclosure is used. The game system 1 includes a game apparatus 10 for executing a game program, an input apparatus 6 through which user instructions are entered in the game apparatus 10, an imaging apparatus 14 for taking pictures of a real space around a user. a head mounted display 100 for displaying a first game image generated by the game apparatus 10, and a display apparatus 12 for displaying a second game image generated by the game apparatus 10.

The game apparatus 10 executes a game program on the basis of instruction input entered from the input apparatus 6 or the head mounted display 100 and the position or attitude of the input apparatus 6 or the head mounted display 100, and generates a first game image to transmit the generated first game image to the head mounted display 100 and generates a second game image to transmit the generated second image to the display apparatus 12.

The head mounted display 100 displays the first game image generated in the game apparatus 10. Further, the head mounted display 100 transmits information related with a user input operation done through an input apparatus arranged on the head mounted display 100 to the game apparatus 10. The head mounted display 100 may be connected to the game apparatus 10 with a wired cable or in a wireless manner such as wireless local area network (LAN).

The display apparatus 12 displays the second game image generated in the game apparatus 10. The display apparatus 12 may be a television having a display and a speaker or a computer display.

The input apparatus 6 has a function of transmitting a user instruction input to the game apparatus 10; in the present embodiment, the input apparatus 6 is configured as a wireless controller that provides wireless communication with the game apparatus 10. The input apparatus 6 and the game apparatus 10 may establish wireless connection by use of a Bluetooth (trademark) protocol. It should be noted that the input apparatus 6 may also be a wired controller connected to the game apparatus 10 with a cable, in addition to a wireless controller.

The input apparatus 6, driven by a battery, is configured by having two or more buttons for performing instruction input operations for making a game progress. When the user operates a button of the input apparatus 6, an instruction input done by this operation is transmitted to the game apparatus 10 through wireless communication.

The imaging apparatus 14 is a video camera configured by a charge coupled device (CCD) imaging device or a complementary metal-oxide semiconductor (CMOS) imaging device for example and takes pictures of a real space with a predetermined period, thereby generating a frame image for each period. The imaging apparatus 14 is connected to the game apparatus 10 through an interface such as universal serial bus (USB) or the like. In image captured by the imaging apparatus 14 is used to derive the positions and attitudes of the input apparatus 6 and the head mounted display 100 in the game apparatus 10. The imaging apparatus 14 may be a ranging camera for obtaining distance or a stereo camera. In this case, the imaging apparatus 14 allows the acquisition of distances between the imaging apparatus 14 and the input apparatus 6 or the head mounted display 100 for example.

In the game system 1 of the present embodiment, the input apparatus 6 and the head mounted display 100 each have a light emission block that emits a light of two or more colors. During a game, the light emission block emits light in color indicated by the game apparatus 10 which is imaged by the imaging apparatus 14. The imaging apparatus 14 takes a picture of the input apparatus 6 and generates a frame image, supplying the generated frame image to the game apparatus 10. Acquiring the frame image, the game apparatus 10 derives the positional information about the light emission block in the real space from the position and size of the image of the light emission block in the frame image. The game apparatus 10 handles the positional information as a game operation instruction, thereby reflecting the game operation instruction onto such processing of the game as controlling the operation of a player's character.

In addition, the input apparatus 6 and the head mounted display 100 each has an acceleration sensor and a gyro sensor. The sensor detection values are transmitted to the game apparatus 10 with a predetermined period. Receiving the sensor detection values, the game apparatus 10 acquires the attitude information of the input apparatus 6 and the head mounted display 100 in the real space. The game apparatus 10 handles the attitude information as an operation instruction for a game and reflects the attitude information onto the processing of the game.

Referring to FIG. 2, there is shown an external view of the head mounted display 100 practiced as one embodiment of the present disclosure. The head mounted display 100 has a main body section 110, a head contact section 112, and a light emission section 114.

Arranged on the main body section 110 are a display, a GPS unit for acquiring positional information, an attitude sensor, and a communication apparatus. The head contact section 112 may include a biometric information acquisition sensor for detecting biometric information such as user's body temperature, heartbeat, blood composition, perspiration, brainwave, and brain blood flow. The light emission selection 114 emits light in a color indicated by the game apparatus 10 as described above and functions as the standard for computing the position of the head mounted display 100 in an image taken by the imaging apparatus 14.

The head mounted display 100 may further include a camera for taking pictures of user's eyes. The camera arranged on the head mounted display 100 allows detection of field of view, pupil movement, and blink of the eyes of the user.

In the present embodiment, the head mounted display 100 is described; however, the display control technology of the present embodiment is also applicable not only to the head mounted display 100 in a limited sense but also a head mounted display having eye glasses, a spectacle-type display, a spectacle-type camera, a headphone, a headset (a headphone with a microphone), an earphone, an earring, an ear-hooked camera, a hat, a hat with camera, or a hair band, for example.

Figure 3:
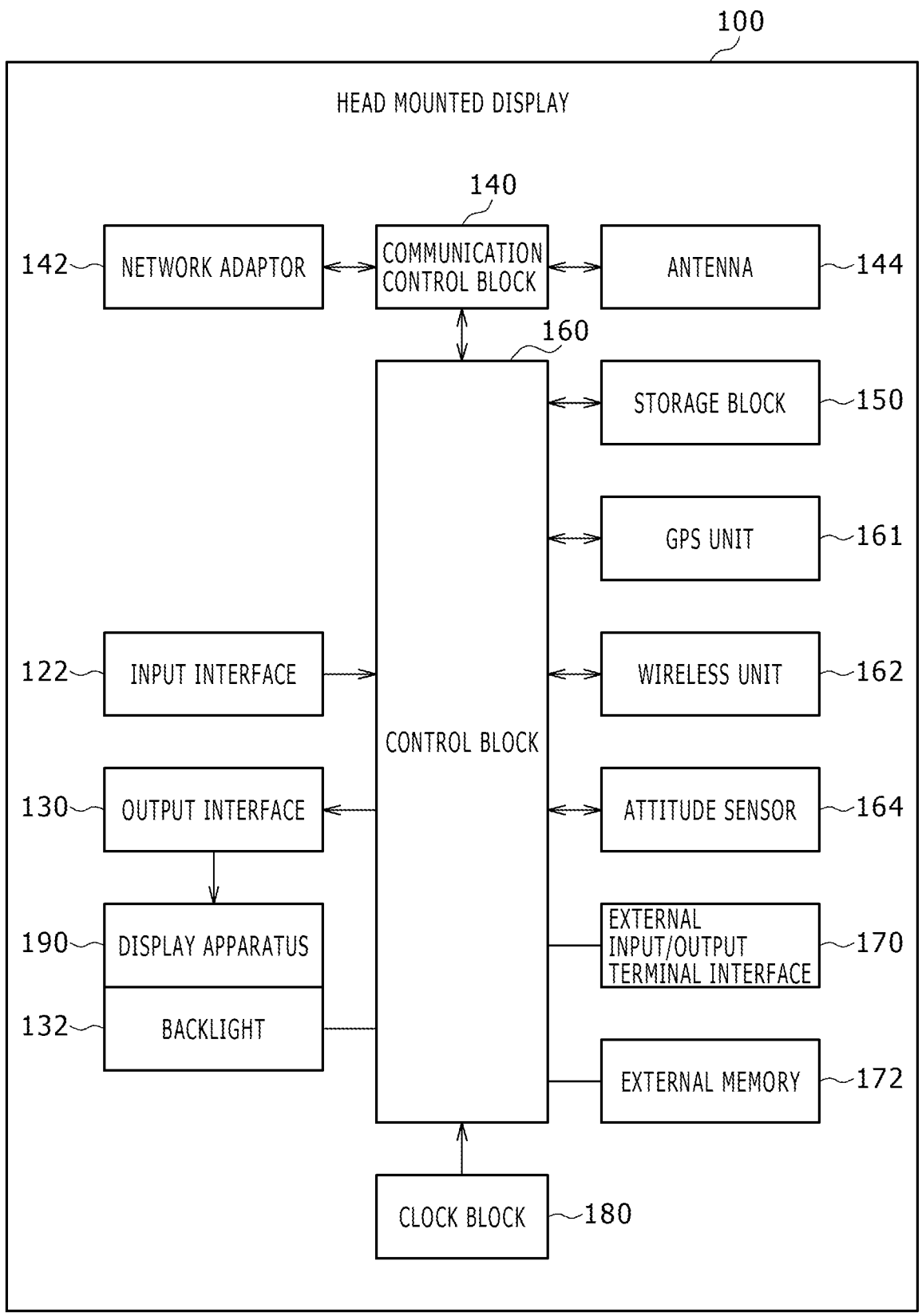
FIG. 3 is a functional configuration diagram illustrating the head mounted display.

Referring to FIG. 3, there is shown a functional diagram of the head mounted display 100. The head mounted display 100 has an input interface 122, an output interface 130, a backlight 132, a communication control block 140, a network adaptor 142, an antenna 144, a storage block 150, a GPS unit 161, a wireless unit 162, an attitude sensor 164, an external input/output terminal interface 170, an external memory 172, a clock block 180, a display apparatus 190, and a control block 160. These functional blocks are also realized by only hardware, only software, or a combination thereof.

The control block 160 is a main processor that processes signals such as an image signal and a sensor signal, instructions, and data and outputs the results of the processing. The input interface 122 receives an operation signal and a setting signal from an input button or the like and supplies the received signals to the control block 160. The output interface 130 receives an image signal from the control block 160 and makes the display apparatus 190 display the received image signal. The backlight 132 supplies backlight to a liquid crystal display that makes up the display apparatus 190.

The communication control block 140 transmits data entered from the control block 160 to the outside in a wired or wireless manner through the network adaptor 142 or the antenna 144. Also, the communication control block 140 receives data from the outside in a wired or wireless manner through the network adaptor 142 or the antenna 144 and outputs the received data to the control block 160.

The storage block 150 temporarily stores data, parameters, and operation signals that are processed by the control block 160.

The GPS unit 161 receives positional information from a GPS satellite by following an operation signal from the control block 160 and supplies the received positional information to the control block 160. The wireless unit 162 receives positional information from a wireless base station by following an operation signal from the control block 160 and supplies the received positional information to the control block 160.

The attitude sensor 164 detects attitude information such as the direction and tilt of the main body section 110 of the head mounted display 100. The attitude sensor 164 can be realized by appropriately combining a gyro sensor, an acceleration sensor, and an angular acceleration sensor.

The external input/output terminal interface 170 is an interface for the connection of peripheral devices such as a USB controller. The external memory 172 is an external memory such as a flash memory.

The clock block 180 sets time information on the basis of a setting signal received from the control block 160 and supplies time data to the control block 160.

Figure 4A:
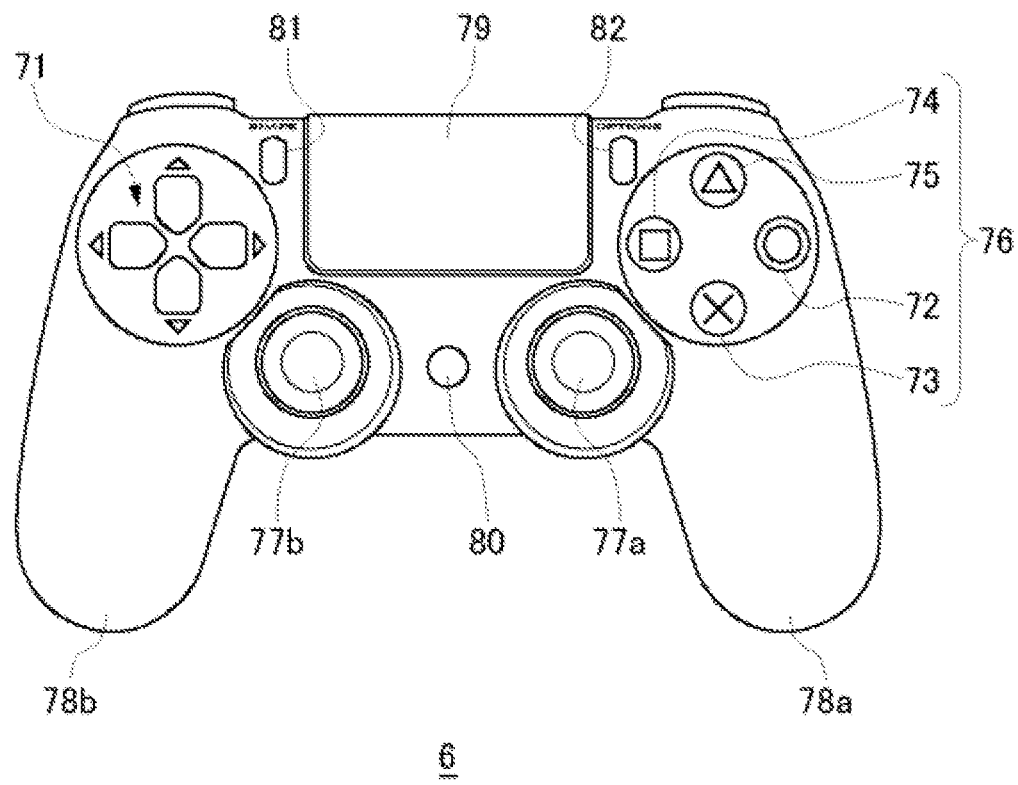
FIGS. 4A and 4B are diagrams illustrating external views of an input apparatus.

Referring to FIG. 4, there is shown an external view of an input apparatus. FIG. 4A shows an external configuration of the top view of the input apparatus. The user holds a left-side hold section 78b by the left hand and a right-side hold section 78a by the right hand and operates the input apparatus 6. Arranged on top of the housing of the input apparatus 6 are a direction key 71, analog sticks 77a and 77b and four-types of operation buttons 76 that make up the input block. Four-types of buttons 72 through 75 are identified by different colors and different symbols. Namely, the circle button 72 has a red circle, the cross button 73 has a blue cross, the square button 74 has a purple square, and a triangle button 75 has a green triangle. On top of the housing, a touch pad 79 is arranged on a flat area between the direction key 71 and the operation button 76. The touch pad 79 sinks when the user presses the panel and returns to the original position when the user releases the panel, thus functioning also as a press button.

A function button 80 is arranged between the two analog sticks 77a and 77b. The function button 80 is used to power on the input apparatus 6 and, at the same time, activate the communication function for interconnecting the input apparatus 6 and the game apparatus 10. After connection of the input apparatus 6 with the game apparatus 10, the function button 80 is also used to display a menu screen on the game apparatus 10.

A SHARE button 81 is arranged between the touch pad 79 and the direction key 71. The SHARE button 81 is used to enter a user instruction for an operating system (OS) or the system software of the game apparatus 10. An OPTIONS button 82 is arranged between the touch pad 79 and the operation button 76. The OPTIONS button 82 is used to enter a user instruction for an application (a game) that is executed on the game apparatus 10. The SHARE button 81 and the OPTIONS button 82 may be formed as push buttons.

Figure 4B:
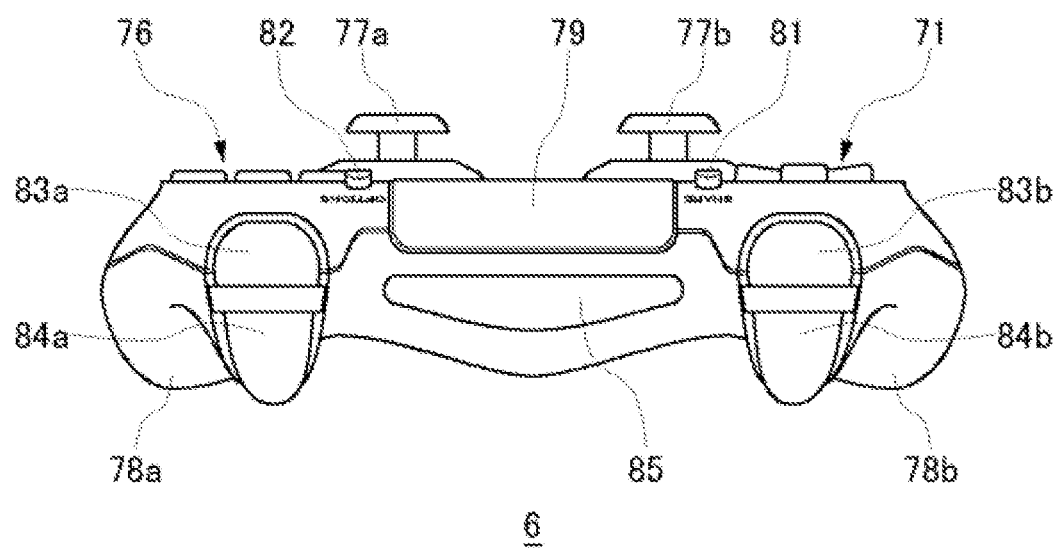

FIG. 4B shows an external configuration of a side of the rear section of the input apparatus. On top of the side of the rear section of the housing of the input apparatus 6, the touch pad 79 extends from the top of the housing; below the side of the rear section of the housing, a light-emitting block 85 that is long sideways is arranged. The light-emitting block 85 has red (R), green (G), and blue (B) light emitting diodes (LEDs) that are turned on according to emitted light color information transmitted from the game apparatus 10.

On the side of the rear section of the housing, an upper button 83a and an upper button 83b are arranged symmetrically along longitudinal direction, and a lower button 84a and a lower button 84b are arranged symmetrically along longitudinal direction. The upper button 83a and the lower button 84a are operated by the index finger and the middle finger of the right hand of the user, respectively; the upper button 83b and the lower button 84b are operated by the index finger and the middle finger of the left hand of the user, respectively. As shown, arranging the light-emitting block 85 between the line of the upper button 83a and the lower button 84a of the right side and the line of the upper button 83b and the lower button 84b of the left side makes the light-emitting block 85 visible without being hidden by the index finger or the middle finger that operates these buttons, thereby allowing the imaging apparatus 14 to suitably image the turned-on light-emitting block 85. The upper buttons 83a and 83b may be configured as a push button and the lower buttons 84a and 84b may be configured as a pivotally supported trigger button.

Referring to FIG. 5, there is shown a configuration of the game apparatus 10. The game apparatus 10 has a main power supply button 20, a power supply ON LED 21, a standby LED 22, a system controller 24, a clock 26, a device controller 30, a media drive 32, a USB module 34, a flash memory 36, a wireless communication module 38, a wired communication module 40, a sub system 50, and a main system 60.

The main system 60 has a main central processing unit (CPU), a memory and a memory controller that form a main storage unit, and a graphics processing unit (GPU) and so forth. The GPU is mainly used for computational processing of game programs. These functions are configured as system-on-chips which may be formed on a single chip. The main CPU has a function of executing game programs recorded to an auxiliary storage apparatus 2.

The sub system 50 has a sub CPU and a memory and a memory controller that form a main storage apparatus and so forth, but does not have either a GPU or a function of executing game programs. The number of circuit gates of the sub CPU is lower than the number of circuit gates of the main CPU and the operation power dissipation of the sub CPU is lower than that of the main CPU. The sub CPU also operates while the main CPU is in a standby state and the processing function of the sub CPU is restricted to lower the power dissipation.

The main power supply button 20 that is arranged on the front side of the housing of the game apparatus 10 and is an input block through which user operation input is executed, is operated to power on/off the main system 60 of the game apparatus 10. The power supply ON LED 21 is turned on when the main power supply button 20 is turned on and the standby LED 22 is turned on when the main power supply button 20 is turned off.

The system controller 24 detects the pressing of the main power supply button 20 by the user. When the main power supply button 20 is pressed with the main power supply being off, the system controller 24 acquires this pressing operation as "on instruction," while, when the main power supply button 20 is pressed with the main power supply being on, the system controller 24 acquires this pressing operation as "off instruction."

The clock 26 is a realtime clock that generates current date and time information and supplies the generated current date and time information to the system controller 24, the sub system 50, and the main system 60.

The device controller 30 is configured as a large-scale integrated circuit (LSI) that executes transfer of information between devices like a south bridge. As shown, the device controller 30 is connected to devices such as the system controller 24, the media drive 32, the USB module 34, the flash memory 36, the wireless communication module 38, the wired communication module 40, the sub system 50, and the main system 60. The device controller 30 absorbs the difference in electric properties and data transfer speeds between the devices and controls the timing of data transfer. The media drive 32 is a drive apparatus which is loaded with a read only memory (ROM) medium 44 recording application software such as games and license information to drive the ROM medium 44, thereby reading programs and data from the ROM medium 44. The ROM medium 44 is a read-only recording medium such as an optical disc, a magneto-optical disc, or a Blu-ray disc, for example.

The USB module 34 is a module for providing connection with external devices through a USB cable. The USB module 34 may provide connection to the auxiliary storage apparatus 2 and the imaging apparatus 14 through a USB cable. The flash memory 36 is an auxiliary storage apparatus that configures an internal storage. The wireless communication module 38 provides wireless communication with the input apparatus 6 for example on the basis of a communication protocol such as Bluetooth (trademark) protocol or IEEE802.11 protocol. It should be noted that the wireless communication module 38 may be compliant with the third-generation digital mobile phone scheme based on the international mobile telecommunication 2000 (IMT-2000) specified by international telecommunication union (ITU) or, further, may be compliant with digital mobile phone schemes of other generations. The wired communication module 40 provides wired communication with external devices, an external network via AP8 for example.

Figure 6:
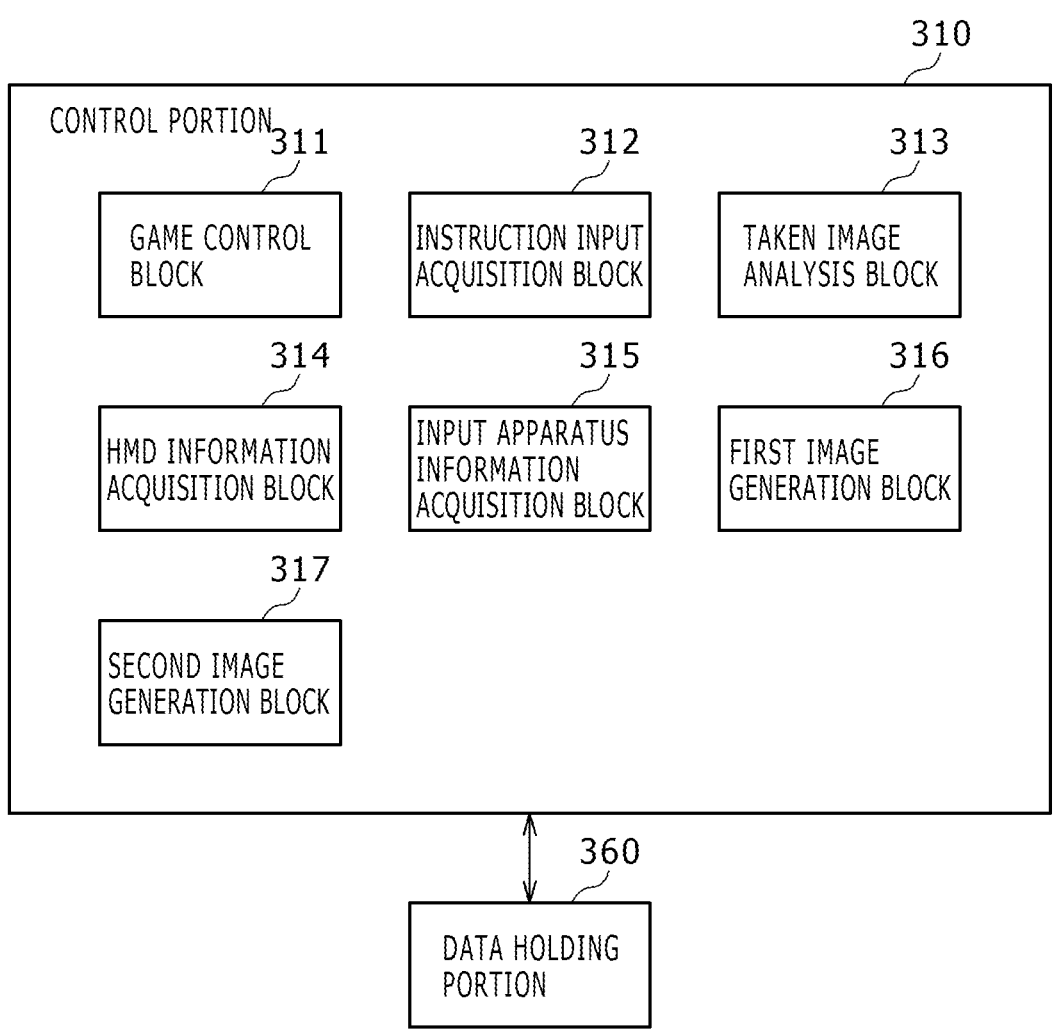
FIG. 6 is a functional configuration diagram illustrating the game machine.

Referring to FIG. 6, there is shown a functional configuration of the game apparatus 10. The main system 60 of the game apparatus 10 has a control portion 310 and a data hold portion 360. The control portion 310 has a game control block 311, an instruction input acquisition block 312, a taken image analysis block 313, an HMD information acquisition block 314, an input apparatus information acquisition block 315, a first image generation block 316, and a second image generation block 317.

The data hold portion 360 holds program data of games that are executed on the game apparatus 10 and various kinds of data that are used by game programs.

The instruction input acquisition block 312 acquires, from the input apparatus 6 or the head mounted display 100, information associated with user instruction input accepted by the input apparatus 6 or the head mounted display 100.

The taken image analysis block 313 acquires an image taken by the imaging apparatus 14 and analyzes the acquired image, thereby computing the positions and attitudes of the input apparatus 6 and the head mounted display 100. The taken image analysis block 313 acquires frame images from the imaging apparatus 14 at a predetermined imaging speed (30 frames/second for example) and extracts the images of the light emission blocks of the input apparatus 6 and the head mounted display 100 from the frame images, thereby identifying the positions and sizes of the light emission blocks in the frame images. For example, the taken image analysis block 313 identifies the gravity center coordinates and radius of the image of a emitting body in the frame images. When the user turns on the light emission block in a color seldom used in an environment where the user uses the game system 1, the precision images of the light emission blocks can be extracted from the frame images.

The taken image analysis block 313 derives the positional information of the input apparatus 6 and the head mounted display 100 as viewed from the imaging apparatus 14 from the position and size of the image of an identified light emitting body. The taken image analysis block 313 derives the positional coordinates in a camera coordinates from the gravity center coordinates of the image of the light emitting body and the information about distance from the imaging apparatus 14 from the radius of the image of the light emitting body. These positional coordinates and distance information form the positional information of the input apparatus 6 and the head mounted display 100.

The HMD information acquisition block 314 acquires information associated with the attitude of the head mounted display from the head mounted display 100. In addition, the HMD information acquisition block 314 acquires the information associated with the position of the head mounted display 100 from the taken image analysis block 313. These pieces of information are transmitted to the game control block 311. The information associated with the attitude of the head mounted display 100 may be obtained by the analysis by the taken image analysis block 313 of the taken image of the head mounted display 100.

The input apparatus information acquisition block 315 acquires the information associated with the attitude of the input apparatus 6 from the input apparatus 6. In addition, the input apparatus information acquisition block 315 acquires the information associated with the position of the input apparatus 6 from the taken image analysis block 313. These pieces of information are transmitted to the game control block 311. The information associated with the attitude of the input apparatus 6 may be obtained by the analysis by the taken image analysis block 313 of the taken image of the input apparatus 6.

If the input apparatus 6 is not imaged by the imaging apparatus 14 because the input apparatus 6 gets out of the imaging range of the imaging apparatus 14 or hidden by the user body or some obstacle, then the input apparatus information acquisition block 315 computes the position of the input apparatus 6 on the basis of the information about the position of the input apparatus 6 obtained last and the attitude of the input apparatus 6 obtained subsequent to that moment. For example, on the basis of the data of translational acceleration obtained from an acceleration sensor of the input apparatus 6, a shift from the position of the input apparatus 6 obtained last may be computed, thereby computing the current position of the input apparatus 6. While the input apparatus 6 is not imaged by the imaging apparatus 14, the positions of the input apparatus 6 are sequentially computed in the same manner. If the input apparatus 6 is imaged by the imaging apparatus 14 again, the positions of the input apparatus 6 sequentially computed by the acceleration data may not indicate the correct position due to the accumulated drift errors, so that the position of the input apparatus 6 newly computed by the taken image analysis block 313 may be used as the current position of the input apparatus 6. This holds the same with the position of the head mounted display 100.

The game control block 311 executes game programs and makes a game progress on the basis of the user instruction input acquired by the instruction input acquisition block 312 and the information associated with the positions or attitudes of the input apparatus 6 or the head mounted display 100. In a game field configured by a virtual three-dimensional space, the game control block 311 changes the positions of player's characters subject to operation on the basis of inputs through the direction key 71 and the analog sticks 77a and 77b of the input apparatus 6 and changes in the position of the input apparatus 6 or the head mounted display 100.

The first image generation block 316 generates an image to be displayed on the head mounted display 100. The first image generation block 316 sets a viewpoint position on the basis of the position of a subject of operation that is controlled by the game control block 311, sets a sightline direction on the basis of the attitude of the head mounted display 100, and renders a virtual three-dimensional space, thereby generating the image of a game field. The first image generation block 316 relates the attitude of the head mounted display 100 with the sightline direction in the game field with a predetermined timing and, subsequently, changes the sightline direction as the attitude of the head mounted display 100 changes. Consequently, the user can look out over the game field by actually moving his or her head, thereby experiencing as if the user actually existed in the game field. The first image generation block 316 adds game-related information and an image or the like to be displayed on the head mounted display 100 to the generated game field image, thereby generating a first image. The first image generated by the first image generation block 316 is transmitted to the head mounted display 100 through the wireless communication module 38 or the wired communication module 40.

The second image generation block 317 generates an image to be displayed on the display apparatus 12. If the same image as an image to be displayed on the head mounted display 100 is displayed on the display apparatus 12, the first image generated by the first image generation block 316 is also transmitted to the display apparatus 12. If an image different from an image to be displayed on the head mounted display 100 is displayed on the display apparatus 12, if a user wearing the head mounted display 100 and a user viewing the display apparatus 12 execute a match game, for example, then the second image generation block 317 sets a viewpoint position and a sightline direction that are different from those with the first image generation block 316 and executes rendering of a virtual three-dimensional space, thereby generating an image of a game field. The second image generation block 317 adds game-related information and an image to be displayed on the display apparatus 12 to the generated game field image so as to generate a second image. The second image generated by the second image generation block 317 is transmitted to the display apparatus 12 through the wireless communication module 38 and the wired communication module 40.

On the basis of a relative position between the input apparatus 6 and the head mounted display 100, the first image generation block 316 can display an image of the input apparatus 6 for the first image. It is difficult for the user wearing the head mounted display 100 to view surrounding situations in the real world; however, displaying an image of the input apparatus 6 at a position in the first image where the input apparatus 6 would be visible unless the user wears the head mounted display 100 allows the user to have a feeling as if he or she were viewing a real world, thereby enhancing the reality of the first image and providing a deeper immersive sense to the user.

When the game control block 311 changes the positions of a subject of operation in a game field, the first image generation block 316 can change viewpoint position setting methods in accordance with the position of a game field. For example, the first image generation block 316 may set a viewpoint position at a predetermined position in the rear of a subject of operation in an area of a game field and makes the viewpoint position follow as the subject of operation moves; on another area, the first image generation block 316 may fix a viewpoint position at a predetermined position regardless of the change in the position of a subject of operation. Consequently, a game field image can be generated by appropriately setting a viewpoint position in accordance with game field positions, thereby providing a user interface of easy operation so as to enhance user convenience.

The first image generation block 316 can generate a first game image for a first user who views the head mounted display 100 and the second image generation block 317 can generate a second game image for a second user who views the display apparatus 12. The first user is unable to view the second game image displayed on the display apparatus 12 and the second user is unable to view the first game image displayed on the head mounted display 100, so that use of this game system allows the execution of a match game while hiding own information from the play mate.

The following describes the above-mentioned features by way of examples of various games.

Figure 7:
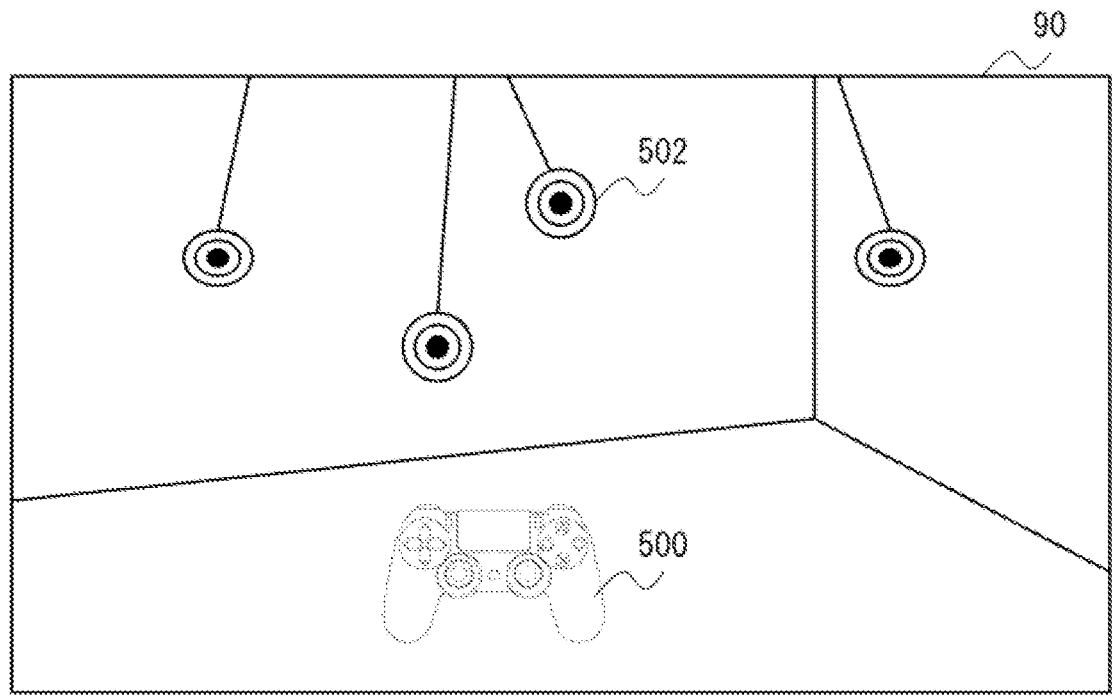
FIG. 7 is a diagram illustrating one example of a first game image that is displayed on the head mounted display.

Shooting Game:

Referring to FIG. 7, there is shown an example of the first game image that is displayed on the head mounted display 100. FIG. 7 shows an image of a game in which targets are shot down with throwing knives thrown from the input apparatus displayed a first game image. In a game field where two or more targets 502 are arranged, the game control block 311 moves the arranged targets 502 in a predetermined manner. The first image generation block 316 sets a viewpoint position data at a predetermined position in the game field and, on the basis of the attitude of the head mounted display 100, sets a sightline direction, thereby rendering the game field so as to generate the first game image. At this moment, on the basis of a relative position between the input apparatus 6 and the head mounted display 100, the first image generation block 316 arranges the input apparatus 6 in the game field and displays an image 500 of the input apparatus 6 in the first image. The image 500 of the input apparatus 6 is generated on the basis of the real input apparatus 6 and displayed with a precision of a degree at which the input apparatus 6 is recognizable by the user to be a real one. When a change occurs in the position and attitude of the input apparatus 6, the first image generation block 316 also changes the position and attitude of the image 500 of the input apparatus 6 in the first game image. Consequently, the reality of the image of the input apparatus 6 that is displayed in the first game image can be enhanced.

Figure 8:
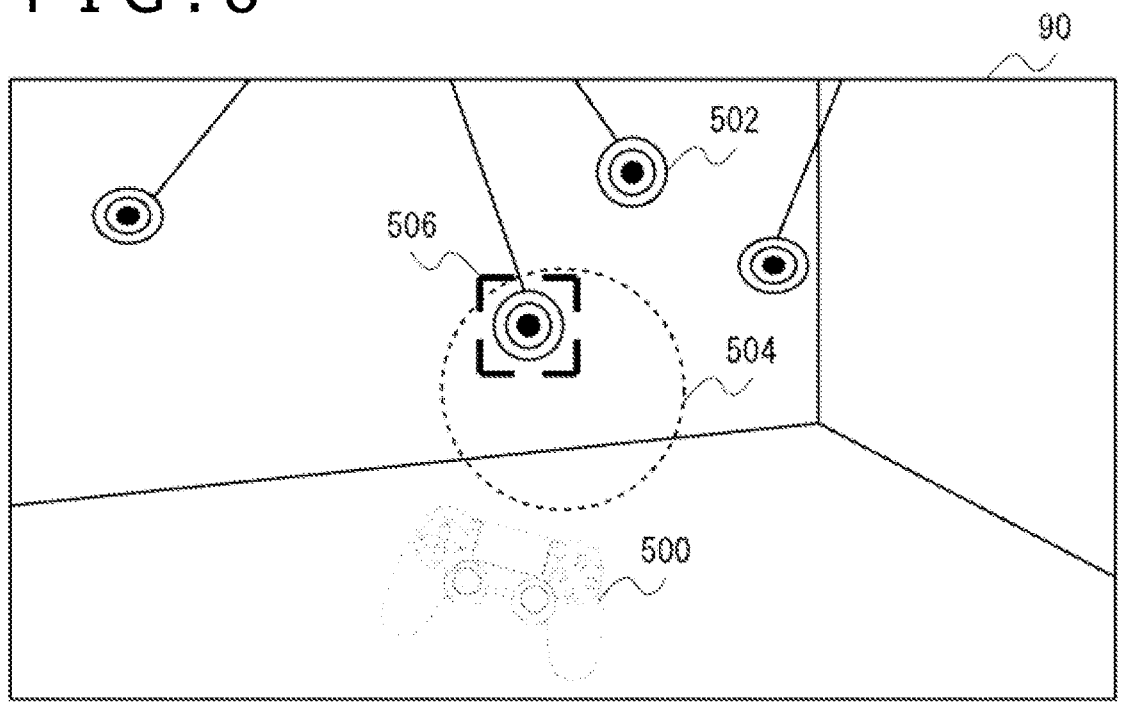
FIG. 8 is a diagram illustrating another example of the first game image that is displayed on the head mounted display.

Referring to FIG. 8, there is shown an example of the first game image that is displayed on the head mounted display 100. When the user shakes his or her head horizontally or vertically to change the attitude of the head mounted display 100, the first image generation block 316 changes the sightline direction in accordance with the attitude of the head mounted display 100. When a target 502 enters a predetermined range 504 at the center of the first game image, the game control block 311 locks on this target 502 as a target and displays on the target 502 a FIG. 506 indicative that the target 502 is locked on. Namely, when the user views the target 502 by directing his or her head in the direction of target 502 displayed in the first game image, the target 502 in the direction of a predetermined range from that direction is locked on. Thus, setting a character or an object in the direction in which the user is viewing as a subject of operation allows the determination or change of subjects of operation with ease without use of the input apparatus 6 for example, thereby enhancing the user convenience.

Figure 9:
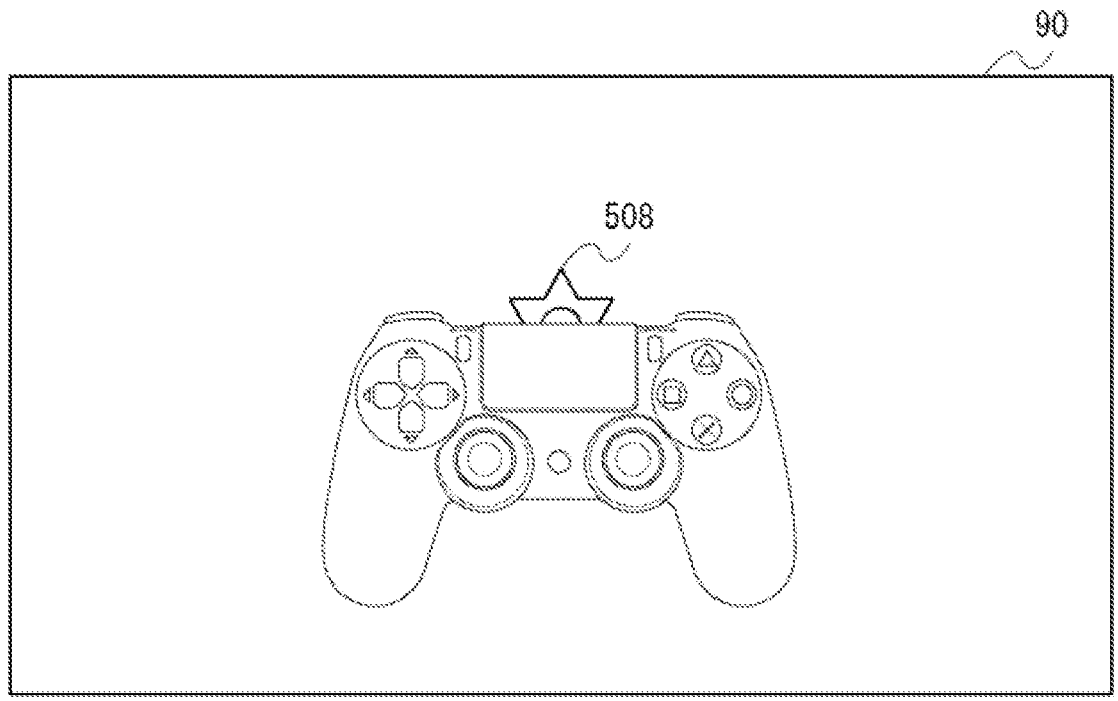
FIG. 9 is a diagram illustrating still another example of a first game image that is displayed on the head mounted display.

Referring to FIG. 9, there is shown an example of the first game image that is displayed on the head mounted display 100. When the user executes a flick operation on the touch pad 79 of the input apparatus 6, the first image generation block 316 displays a manner in which a throwing knife 508 is thrown from the position of the touch pad 79 in the image 500 of the input apparatus 6 displayed in the first game image in accordance with a moving distance of the flick operation. At this moment, a user's hand may be displayed in the first image or, so as to enhance the visibility of the throwing knife, the user's hand may be not displayed. Thus, changing the image 500 of the input apparatus 6 displayed in the first game image in accordance with instruction input entered in the input apparatus 6 allows the feedback of the instruction entered by the user in the first game image so as to indicate the reflection of the instruction in an easy-to-understand manner. Further, this setup gives a feeling to the user that a throwing knife comes out of the input apparatus 6 actually held by the user, so that the user can experience a unique feeling in which a real world and a virtual world melt together.

Figure 10:
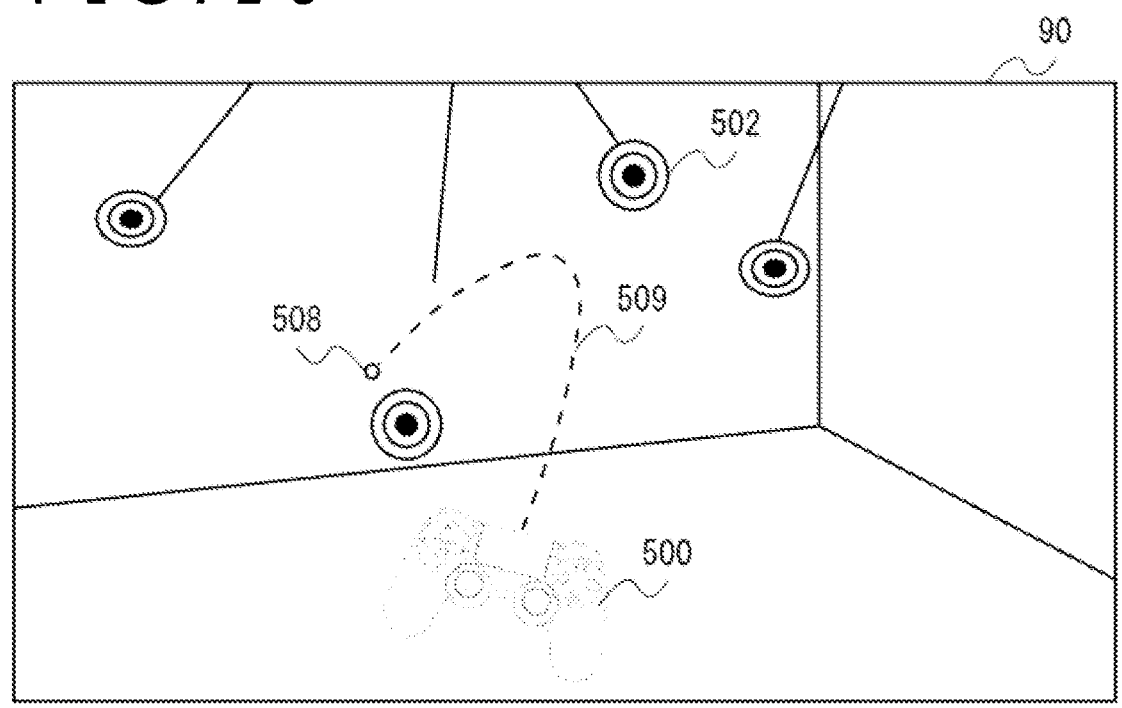
FIG. 10 is a diagram illustrating yet another example of a first game image that is displayed on the head mounted display.

Referring to FIG. 10, there is shown an example of the first game image that is displayed on the head mounted display 100. When the moving distance of a flick operation done by the user on the touch pad 79 of the input apparatus 6 exceeds a predetermined value, the game control block 311 throws a throwing knife 508 in a direction determined on the basis of the attitude of the input apparatus 6 from a virtual position of the input apparatus 6 at a speed corresponding to the speed of the flick operation, in a game field. The first image generation block 316 generates a first game image indicative of a manner in which the throwing knife 508 is thrown. The game control block 311 computes a locus 509 of the throwing knife 508 on the basis of physical computation and moves the throwing knife 508 in accordance with the computed locus 509. If the throwing knife 508 hits one of the targets 502, the game control block 311 drops the hit target 502. As described above, if a target is locked on, the game control block 311 does not move the throwing knife along the computed locus, but recalculates the locus so as to the throwing knife travels toward the target, thereby moving the throwing knife along the recalculated locus. In this case, the throwing knife hits the locked-on target, thereby dropping this target.

Figure 11:
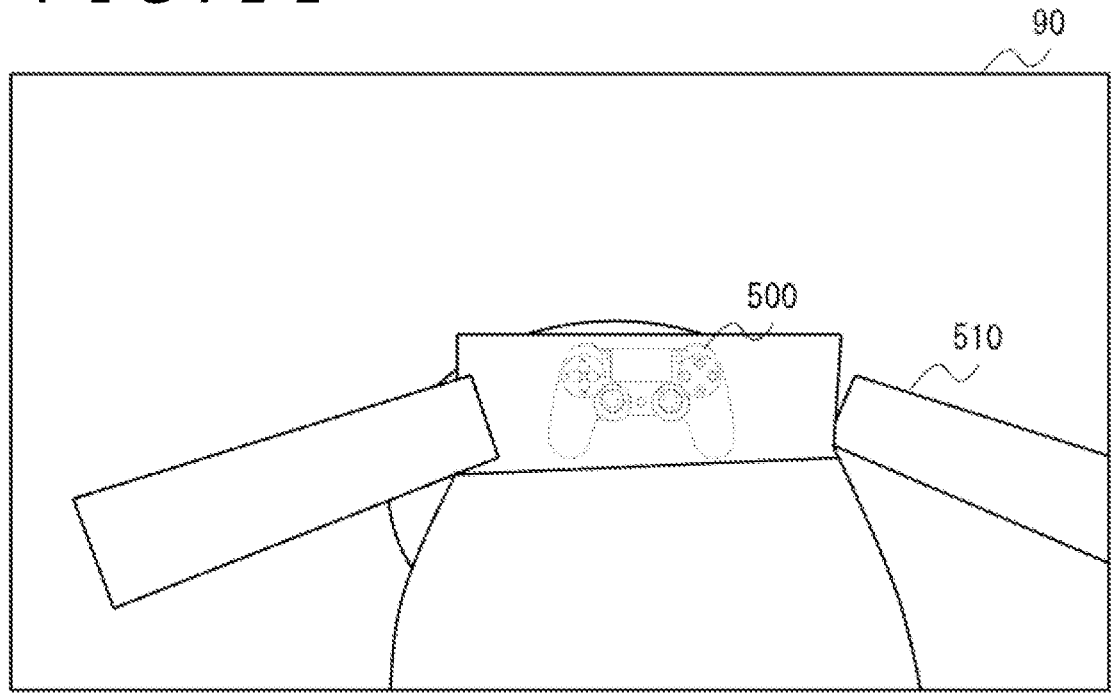
FIG. 11 is a diagram illustrating a different example of a first game image that is displayed on the head mounted display.

Racing Game:

Referring to FIG. 11, there is shown an example of the first game image that is displayed on the head mounted display 100. This diagram shows an image of a racing game in which players ride bicycles and runs along a predetermined course, thereby competing for the time required to reach a goal. The game control block 311 makes the bicycles run in accordance with the input entered through buttons and the like on the input apparatus 6 in a game field where a predetermined course is arranged and controls the travel direction of the bicycles in accordance with the attitude of the input apparatus 6. In addition, the game control block 311 executes control such that, when the position of the head mounted display 100 gets lower, the air resistance to the body of the user pedaling the bicycle gets smaller, so that the speed of the bicycle is increased; conversely, when the position of the head mounted display 100 gets higher, the air resistance gets greater, so that the speed of the bicycle is decreased. In this game too, the image 500 of the input apparatus 6 is displayed in the first game image and the front image of the bicycle is displayed such that the image 500 of the input apparatus 6 comes to the center of a handle 510. As the position and attitude of the input apparatus 6 change, the first image generation block 316 changes the position and attitude of the image 500 of the input apparatus 6 in the first game image and then changes the position and attitude of the front image of the bicycle.

In this racing game, the input apparatus 6 is regarded as the handle of the bicycle; however, if the position of the input apparatus 6 largely deviates from the initial position, the position of the handle gets to an unnatural position, thereby canceling the premise that the handle be operated as the input apparatus 6. Therefore, if the position of the input apparatus 6 deviates from a predetermined range with the position of the input apparatus 6 at a predetermined timing used as standard before a race begins or during a race, the game control block 311 notifies the user of that fact by displaying thereof in the first game image, outputting sound, or vibrating the input apparatus 6 for example, thereby prompting the user to return the position of the input apparatus 6 to the correct position. At this moment, the game control block 311 may stop accepting the instruction input associated with bicycle travel or stop the bicycle. By deleting the front image of the bicycle from the first game image or displaying a manner in which the input apparatus 6 is shifted from the center of the handle of the bicycle, the first image generation block 316 may notify the user that the input apparatus 6 is no more functioning as the handle of the bicycle. If the position of the input apparatus 6 deviates from the reference position by more than a first range, then the game control block 311 may notify the user thereof; if the position of the input apparatus 6 deviates from the reference position by more than the second range greater than the first range, then the game control block 311 may display a manner in which the input apparatus 6 gets out of the bicycle without accepting the instruction input from the input apparatus 6. Consequently, the input apparatus 6 can be operated within a proper range, thereby preventing the deviation from the imaging range of the imaging apparatus 14 or the inability of displaying the image of the input apparatus 6 into the first game image.

Figure 12:
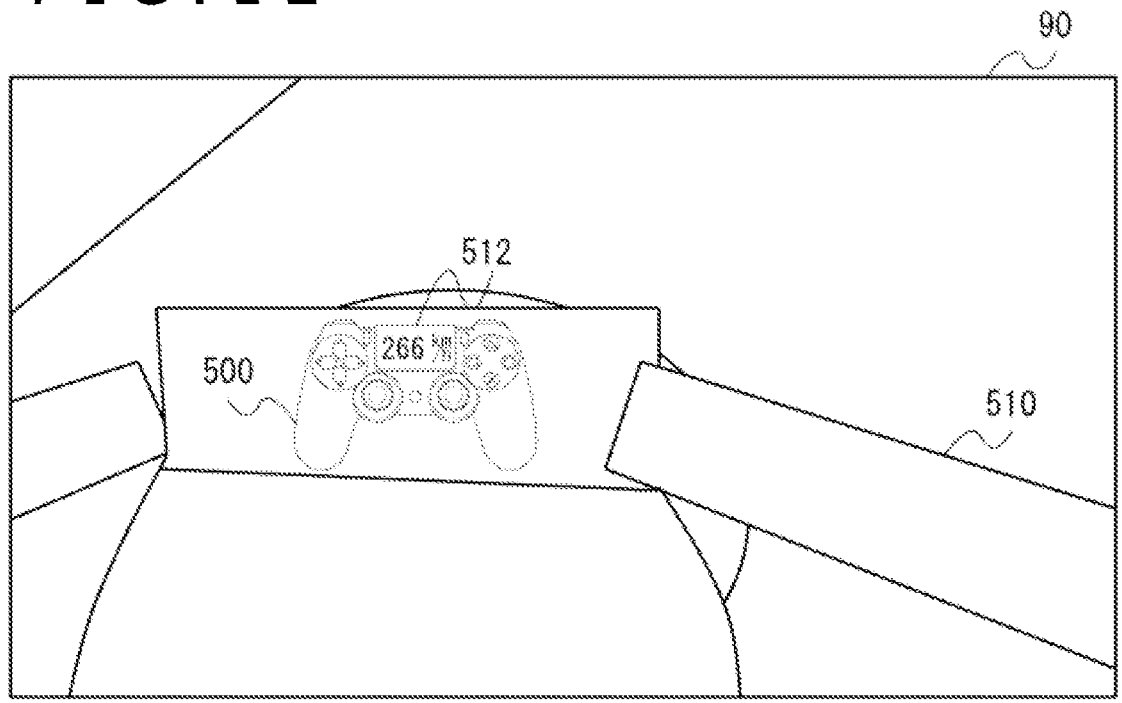
FIG. 12 is a diagram illustrating a still different example of a first game image that is displayed on the head mounted display.

Referring to FIG. 12, there is shown an example of the first game image that is displayed on the head mounted display 100. The first image generation block 316 displays current speed 512 of the bicycle at the position of the touch pad 79 of the image 500 of the input apparatus 6 displayed in the first game image. This setup allows displaying as if a display apparatus were arranged although there is no display apparatus arranged on the touch pad 79 of the real input apparatus 6. In addition, this setup allows displaying of information to be presented to the user in the game, in a novel form.

Figure 13:
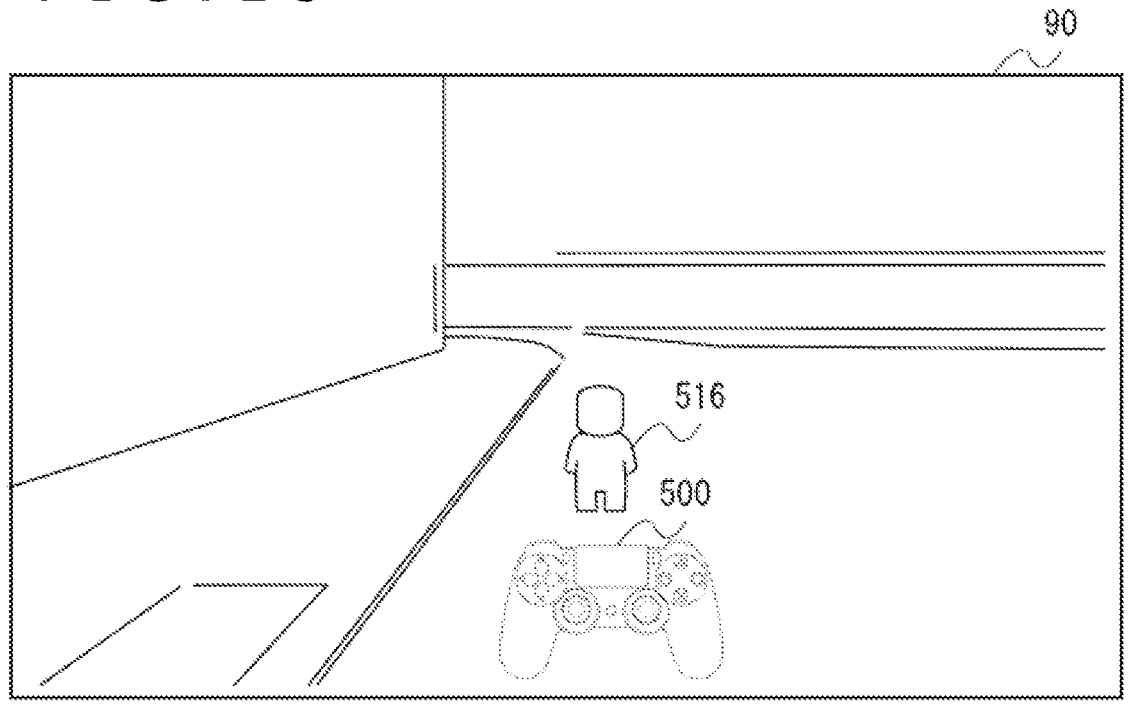
FIG. 13 is a diagram illustrating a yet different example of a first game image that is displayed on the head mounted display.

Action Game:

Referring to FIG. 13, there is shown an example of the first game image that is displayed on the head mounted display 100. This diagram shows an image of a game in which a player's character 516 is operated and moved inside a game field, thereby leading the player's character 516 to a predetermined goal. In a game field where obstacles and undulations are arranged, the game control block 311 moves the player's character 516 in accordance with the input from the direction key or analog sticks or the like of the input apparatus 6 and makes the player's character 516 jump in accordance with the input from a button or the like.

In such an action game, depending on the position of a game field, different methods are applied to the setting of the viewpoint position of the camera used by the first image generation block 316 when generating the first game image. In the example of this diagram, the viewpoint position is set at a predetermined position in the rear and above the player's character 516 and the viewpoint position is moved as the player's character 516 moves. The sightline direction is changed in accordance with the attitude of the head mounted display 100. Namely, an image is generated in which the user feels as if he or she were viewing the game field riding a vehicle following the player's character 516 from behind.

Figure 14:
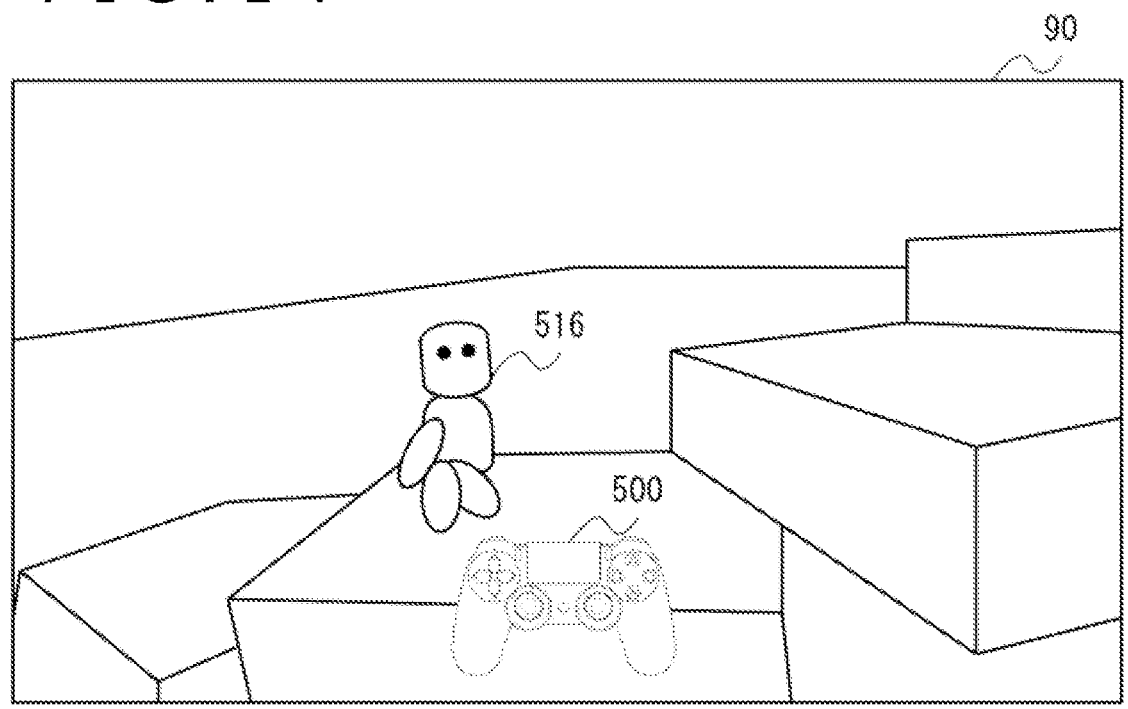
FIG. 14 is a diagram illustrating a separate example of a first game image that is displayed on the head mounted display.

Referring to FIG. 14, there is shown an example of the first game image that is displayed on the head mounted display 100. In the example of this diagram, the viewpoint position is fixed to a predetermined position in a game field and only the sightline direction is changed in accordance with the attitude of the head mounted display 100. Namely, an image is generated in which the user feels as if he or she were viewing the game field without moving after getting down from a vehicle.

For the data of a game field, data for specifying rules of determining a viewpoint position is set in addition to contour data such as geological features and the data of arranged characters and items. These pieces of data may be set for each area obtained by dividing the game field into two or more areas. Updating the position of the player's character in accordance with the instruction input by the user, the game control block 311 transmits the rules of determining the viewpoint position specified at the updated position to the first image generation block 316. The first image generation block 316 determines the viewpoint position in accordance with the rules transmitted from the game control block 311, thereby rendering the game field. For example, in the example shown in FIG. 14, the viewpoint position remains fixed while the player's character is inside the predetermined area; however, when the position of the player's character deviates from the predetermined area and enters another area, the first image generation block 316 determines the viewpoint position in accordance with the rules specified in the new area, thereby setting the viewpoint position at a predetermined position in the rear of the player's character for example.

Consequently, a game producer can flexibly set how to suitably generate game images by appropriately setting a viewpoint position in accordance with the geological features of a game field, the types of arranged items, gimmicks, and characters, and the actions to be executed by a player's character. Further, since appropriate game images can be generated in match with the situations of a game field, user convenience is enhanced.

The rules of determining a viewpoint position may be dynamically set in accordance with situations of a game field. For example, in the case where the geological features of the game field change, an algorithm for determining rules from the geological features of the game field may be specified in advance, thereby first determining the rules from the geological features of the game field and then determining a viewpoint position in accordance with the determined rules. Consequently, an appropriate viewpoint position can be set in conformity with the situations of the game field, thereby enhancing user convenience.

Figure 15:
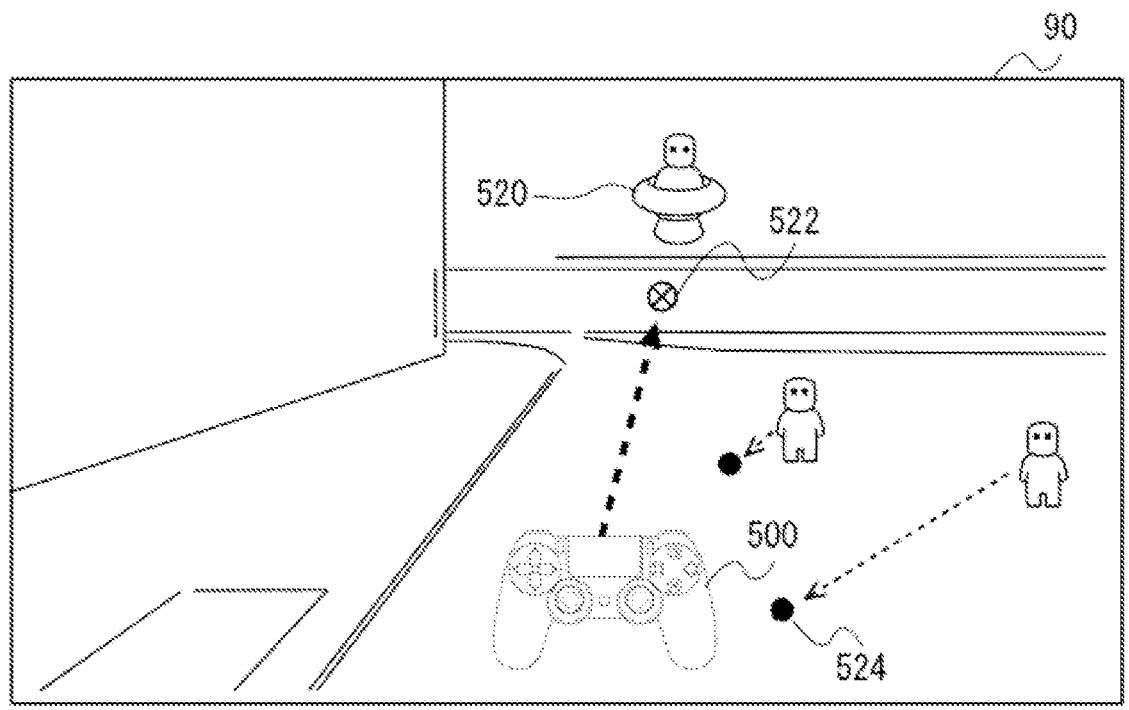
FIG. 15 is a diagram illustrating a still separate example of a first game image that is displayed on the head mounted display.

Match Game:

Referring to FIG. 15, there is shown an example of the first game image that is displayed on the head mounted display 100. This diagram shows an image of a game in which a first user wearing the head mounted display 100 and a second user viewing the display apparatus 12 fight each other. In this match game, while throwing a bomb 522 to the second character 520 of the second user by the input in the input apparatus 6, the first user moves the head mounted display 100 to move a first character, thereby avoiding a bomb 524 thrown by the second character 520. While throwing the bomb 524 to the first character by the input in the input apparatus 6, the second user enters the input in the input apparatus 6 to move the second character 520, thereby avoiding the bomb 522 thrown by the first character. Two or more second users may participate in a match game; in this case, two or more second characters may attack the first character.

The first image generation block 316 sets a viewpoint position at a position of the first character in a game field and then sets the sightline direction in the direction to which the head mounted display 100 faces, thereby generating the first image. Therefore, in the example shown in this diagram, a game image of first-person viewpoint is displayed on the head mounted display 100. The bomb 524 thrown by the second character 520 looks like it is flying to the user, so that a game high in reality can be provided.

The game control block 311 changes the position of the first character as the attitude of the head mounted display 100 changes. In addition, the game control block 311 throws the bomb 522 in the direction indicated by the first character in accordance with the instruction input to the input apparatus 6 and computes a locus by physical computation or the like, thereby moving the bomb 522. If the bomb 522 thrown by the first character hits the second character 520, then the physical strength value of the second character 520 is decreased by a predetermined value. The bomb 524 thrown by the second character 520 hits the first character, then the physical strength value of the first character is decreased by a predetermined value. If the physical strength of any one of the characters reaches zero, the game ends at that moment.

Figure 16:
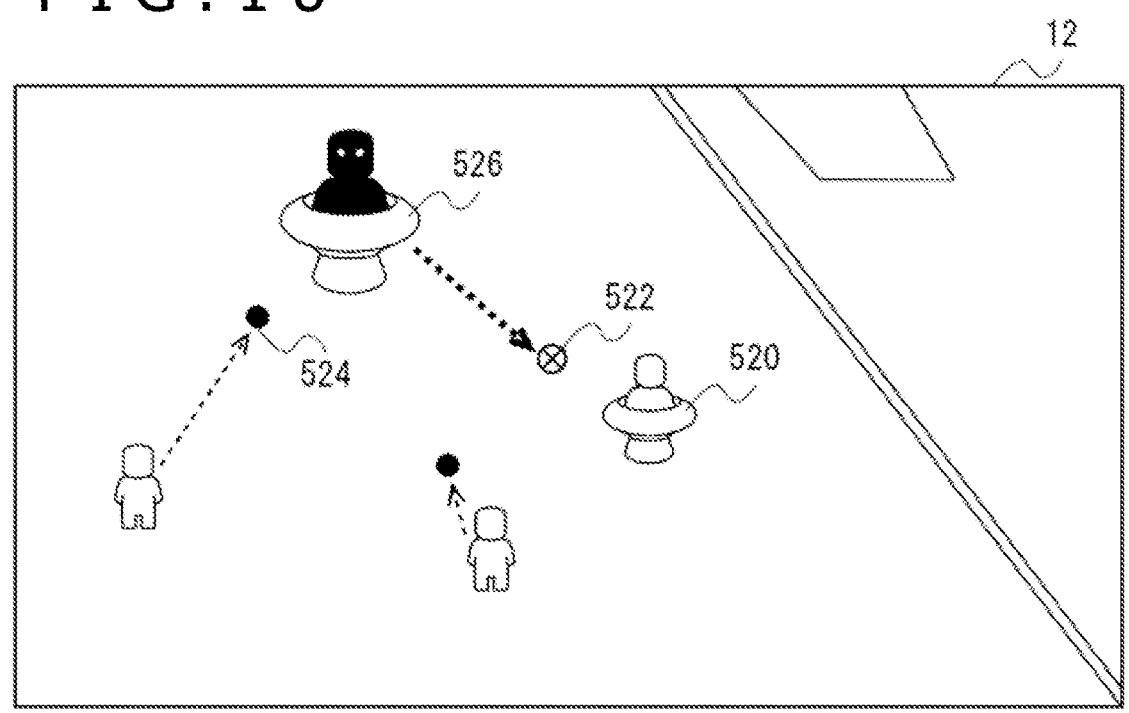
FIG. 16 is a diagram illustrating one example of a second game image that is displayed on a display apparatus.

Referring to FIG. 16, there is shown an example of the second game image that is displayed on the display apparatus 12. The second image generation block 317 fixes the viewpoint position and the sightline direction so as to allow the view over the entire game field and the displaying of a first character 526 and the second character 520 in the game image, thereby generating the second image. If there are a single second user and a single second character 520, then the second image generation block 317 may set the viewpoint position at the position of the second character 520 or a predetermined position in the rear of the second character 520 to set the sightline direction in the moving direction of the second character 520, thereby generating the second image; if there are two or more second users and two or more second characters 520, then it is desirable for the second image generation block 317 to generate the second image fixed such that the entire game field can be viewed, thereby facilitating all second users to view the game image.

In accordance with the instruction input to the input apparatus 6, the game control block 311 changes the position of the second character 520. In addition, in accordance with the instruction input to the input apparatus 6, the game control block 311 throws the bomb 524 in the direction indicated by the second character 520 and computes a locus by physical computation or the like, thereby moving the bomb 524.

As described above, in a game where the first user and the second user share the same virtual three-dimensional space and both the users interact with each other in this virtual three-dimensional space, game images with the same virtual three-dimensional space viewed from separate viewpoints can be provided to each of the users.

Figure 17:
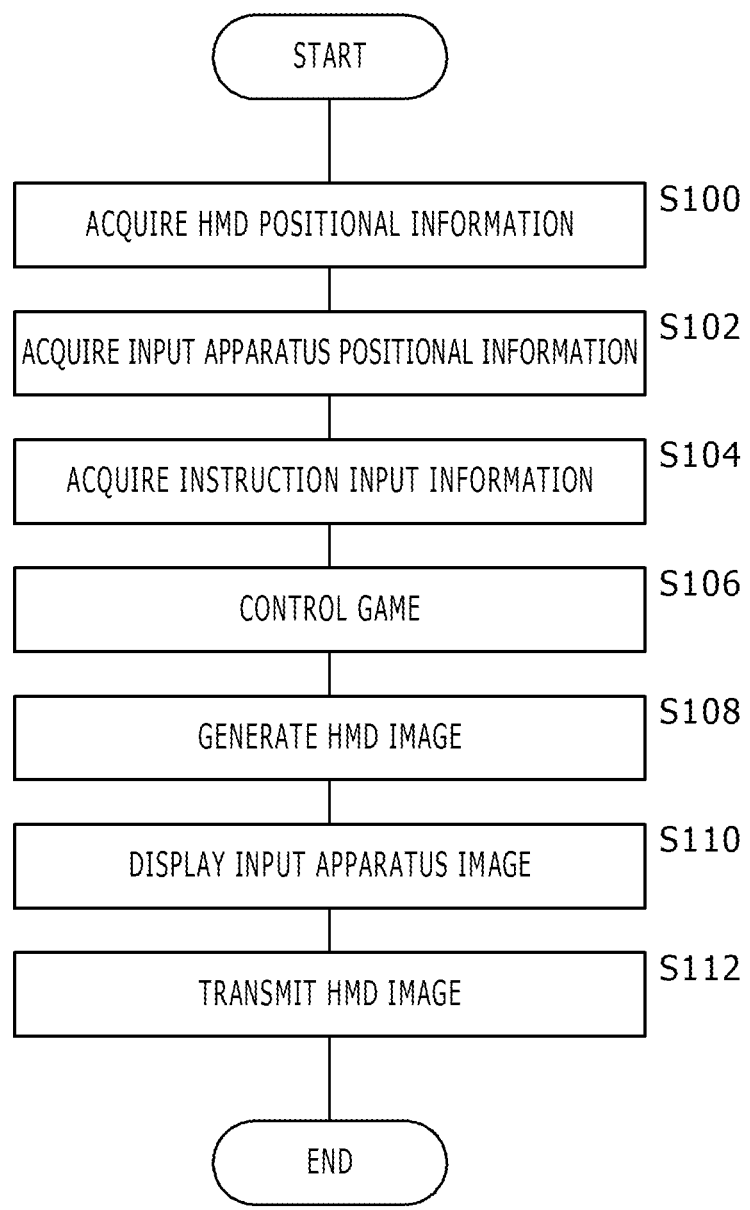
FIG. 17 is a flowchart indicative of a procedure of a display control method practiced as still another embodiment of the present disclosure.

Referring to FIG. 17, there is shown a flowchart indicative of a procedure of a display control method practiced as one embodiment of the present invention. The HMD information acquisition block 314 acquires the positional information of the head mounted display 100 obtained from a taken image of the head mounted display 100 (S100) and the input apparatus information acquisition block 315 acquires the positional information of the input apparatus 6 acquired from a taken image of the input apparatus 6 (S102). The instruction input acquisition block 312 acquires the information associated with the instruction input from the input apparatus 6 (S104). The game control block 311 controls the game on the basis of the position of the head mounted display 100, the position of the input apparatus 6, and instruction input from the input apparatus 6 (S106). The first image generation block 316 generates an image of the game to be controlled by the game control block 311, the image being to be displayed on the head mounted display 100 (S108). At this moment, the first image generation block 316 displays the image of the input apparatus 6 in the generated image on the basis of a relative position between the head mounted display 100 and the input apparatus 6 (S110). The generated image is transmitted to the head mounted display 100 (S112).

Figure 18:
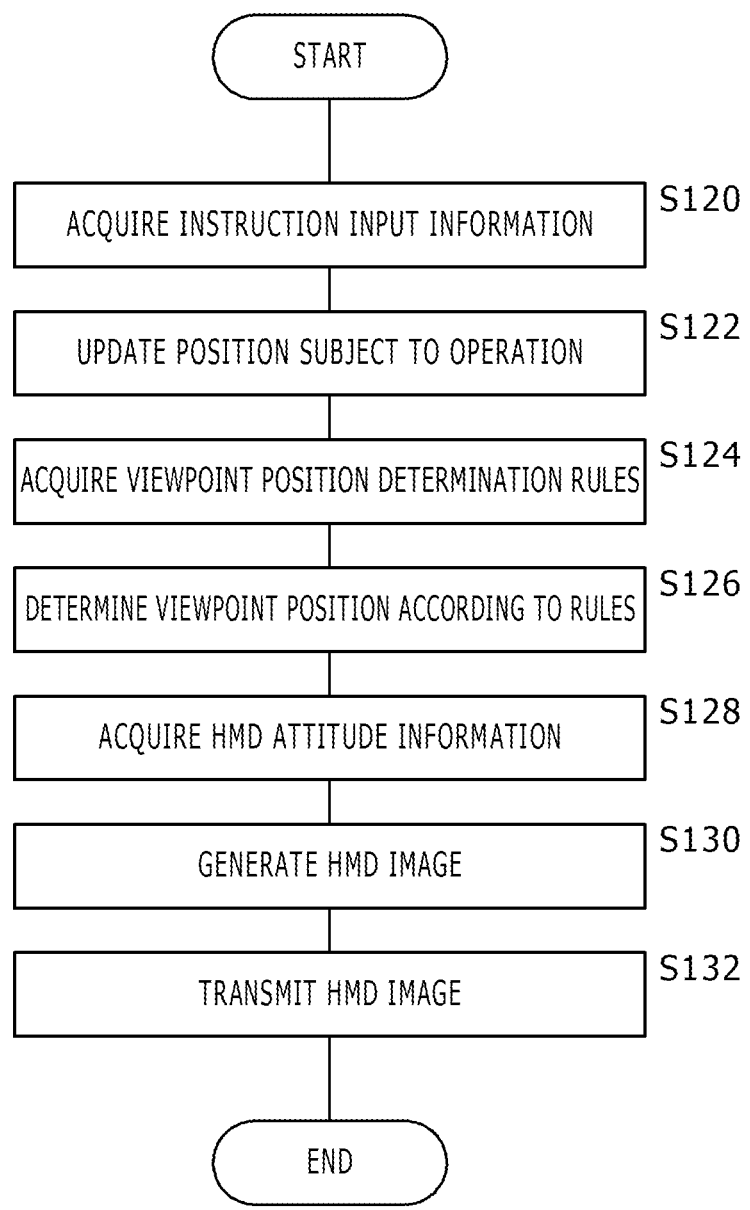
FIG. 18 is a flowchart indicative of a procedure of the display control method practiced as still another embodiment of the present disclosure.

Referring to FIG. 18, there is shown a flowchart indicative of a procedure of the display control method practiced as one embodiment of the present invention. The instruction input acquisition block 312 acquires the information associated with an instruction input from the input apparatus 6 (S120). The game control block 311 updates the position subject to operation on the basis of an input instruction (S122) and acquires rules for determining a viewpoint position specified at the updated position (S124). The first image generation block 316 determines the viewpoint position in accordance with the rules for determining a viewpoint position (S126).

The HMD information acquisition block 314 acquires the information associated with the attitude of the head mounted display 100 from the head mounted display 100 (S128). The first image generation block 316 generates an image to be displayed on the head mounted display 100 by use of the determined viewpoint position and the sightline direction determined on the basis of the attitude of the head mounted display 100 (S130). The generated image is transmitted to the head mounted display 100 (S132).

Figure 19:
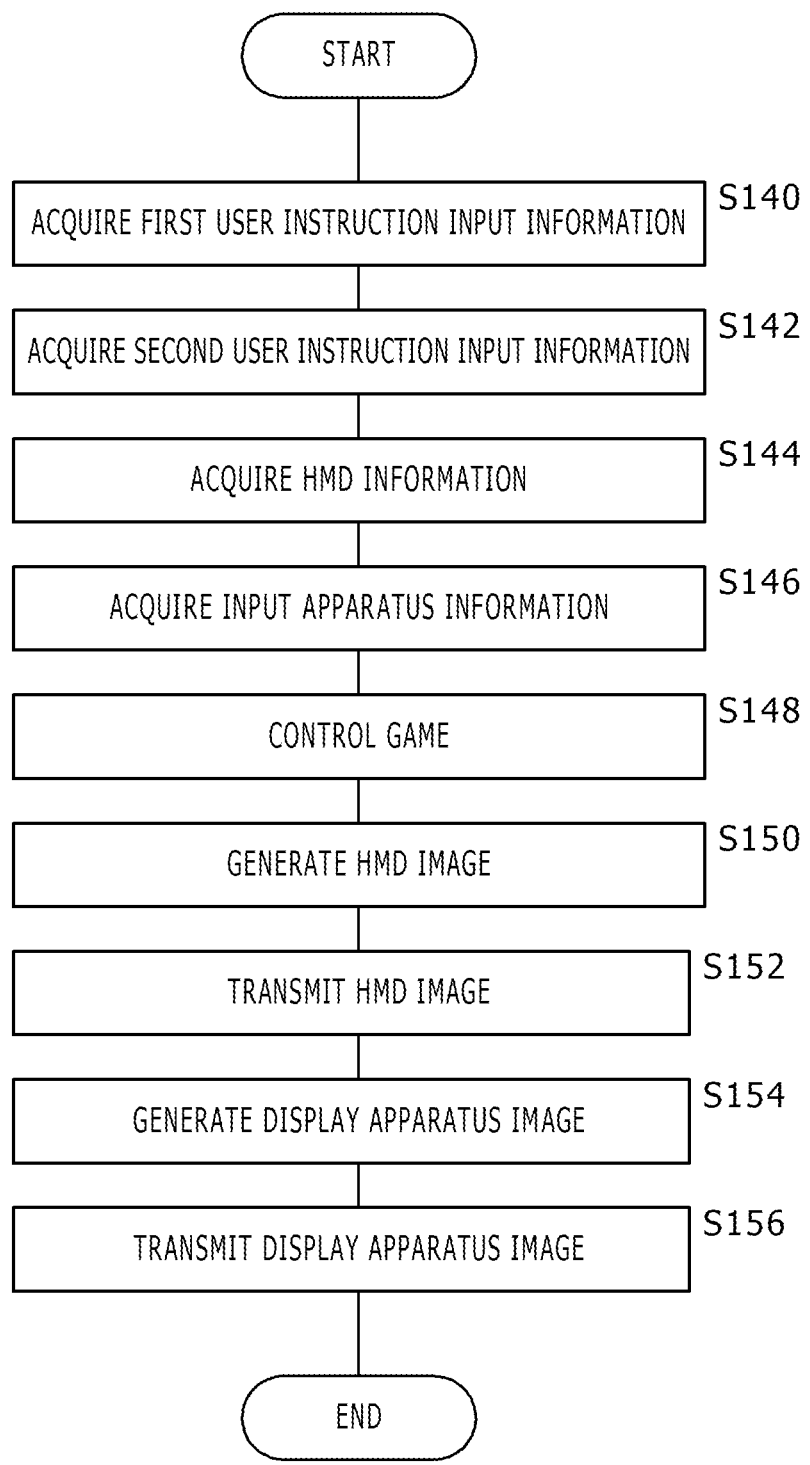
FIG. 19 is a flowchart indicative of a procedure of the display control method practiced as still another embodiment of the present disclosure.

Referring to FIG. 19, there is shown a flowchart indicative of a procedure of the display control method practiced as one embodiment of the present invention. The instruction input acquisition block 312 acquires the information associated with an instruction input from the input apparatus 6 of the first user (S140) and, at the same time, acquires the information associated with an instruction input from the input apparatus 6 of the second user (S142). The HMD information acquisition block 314 acquires the information associated with position and attitude of the head mounted display 100 (S144) and the input apparatus information acquisition block 315 acquires the information associated with the position and attitude of the input apparatus 6 (S146). The game control block 311 controls the game on the basis of the input instruction, the position and attitude of the head mounted display 100, and the position and attitude of the input apparatus 6 (S148). The first image generation block 316 generates the first image to be displayed on the head mounted display 100 by use of the viewpoint position and sightline direction of the first user (S150), the generated first image being transmitted to the head mounted display 100 (S152). The second image generation block 317 generates the second image to be displayed on the display apparatus 12 by use of the viewpoint position and sightline direction of the second user (S154), the generated second image being transmitted to the display apparatus 12 (S156).

While preferred embodiments of the present invention have been described using specific terms, such description is for illustrative purpose only, and it is to be understood by those skilled in the art that changes and variations may be made without departing from the spirit or scope of the following claims.

In the examples described above, an image for monocular vision is displayed on the display apparatus 190 of the head mounted display 100; it is also practicable to display an image for binocular vision.

In the examples described above, the head mounted display 100 is used in a game system; the technologies described in the embodiments of the present invention are also applicable to display content other than games.

The present technology contains subject matter related to that disclosed in Japanese Priority Patent Application JP 2015-039075 filed in the Japan Patent Office on Feb. 27, 2015, the entire content of which is hereby incorporated by reference.

What is claimed is:

1. A display control apparatus comprising:
processing circuitry configured to
acquire information indicative of a position of a head mounted display worn on a head of a user;
render a virtual three-dimensional space and generate an image of the virtual three-dimensional space to be displayed on the head mounted display at a viewpoint position and a sightline direction; and
receive, by a physical input device, input for controlling a location of a character in the virtual three-dimensional space, display an image of the physical input device at a position in the image determined on a basis of a relative position of the physical input device to the head mounted display, and generate a locus extending from the image of the physical input device, wherein the circuitry for generating the locus is further configured to in a first case, calculate the locus based on a physical computation, and in a second case different from the first case, recalculate, based on a target, the locus calculated based on the physical computation in the first case, wherein an object is moved based on the locus extending from the image of the physical input device.

2. The display control apparatus according to claim 1, wherein the object is used to hit a target.

3. The display control apparatus according to claim 1, wherein the processing circuitry is further configured to change the image of the physical input device in accordance with an instruction input entered in the physical input device.

4. The display control apparatus according to claim 1, wherein when the character moves using the physical input device, the sightline direction is fixed in a moving direction of the character.

5. The display control apparatus according to claim 1, wherein when the character moves using the physical input device, the viewpoint position follows a position of the character.

6. The display control apparatus according to claim 1,
wherein, when the character is in a predetermined area of the virtual three-dimensional space, the viewpoint position is fixed and the sightline direction is changed on a basis of an attitude of the head mounted display, and wherein, when the character moves using the input device, the viewpoint position is changed.

7. The display control apparatus according to claim 6, wherein the viewpoint position is fixed behind the character when a position of the character is in the predetermined area.

8. The display control apparatus according to claim 6, wherein when the character is in the predetermined area of the virtual three-dimensional space, the character does not move.

9. The display control apparatus according to claim 6, wherein the viewpoint position is fixed such that an entire game field can be viewed.

10. The display control apparatus according to claim 6, wherein the processing circuitry is further configured to change at least a viewpoint position setting method or a sightline direction setting method in accordance with a position of the character in the virtual three-dimensional space.

11. The method of claim 1, further comprising:
in a case that the character is in a predetermined area of the virtual three-dimensional space, fixing the viewpoint position and changing the sightline on a basis of an attitude of the head mounted display; and in a case that the character moves using the input device, changing the viewpoint position.

12. A method for rendering a virtual-three dimensional space comprising:

acquiring information indicative of a position of a head mounted display worn on a head of a user;

rendering a virtual three-dimensional space;

generating an image of the virtual three-dimensional space to be displayed on the head mounted display at a viewpoint position and a sightline direction;

controlling a location of a character in the virtual three-dimensional space using a physical input device;

displaying an image of the physical input device at a position in the image determined on a basis of a relative position of the physical input device to the head mounted display;

generating a locus extending from the image of the physical input device, wherein generating the locus includes in a first case, calculating the locus based on a physical computation; and in a second case different from the first case, recalculating, based on a target, the locus calculated based on the physical computation in the first case; and moving an object based on the locus extending from the image of the physical input device.

13. The method of claim 12, wherein the object is used to hit a target.

14. The method of claim 12, further comprising:
changing the image of the physical input device in accordance with an instruction input entered in the physical input device.

15. The method of claim 12, further comprising:
in a case that the character moves using the physical input device, fixing the sightline direction in a moving direction of the character.

16. The method of claim 12, further comprising:
in a case that the character moves using the physical input device, following, as the viewpoint position, a position of the character.

17. A non-transitory computer readable storage medium storing computer-readable instructions thereon which, when executed by a computer, cause the computer to perform a method, the method comprising:

acquiring information indicative of a position of a head mounted display worn on a head of a user;

rendering a virtual three-dimensional space;

generating an image of the virtual three-dimensional space to be displayed on the head mounted display at a viewpoint position and a sightline direction; and controlling a location of a character in the virtual three-dimensional space;

displaying an image of the input device at a position in the image determined on a basis of a relative position of a physical input device to the head mounted display; and generating a locus extending from the image of the physical input device, wherein generating the locus includes in a first case, calculating the locus based on a physical computation; and in a second case different from the first case, recalculating, based on a target, the locus calculated based on the physical computation in the first case; and moving an object based on the locus extending from the image of the physical input device.

* * * * *